United States Patent
Wilson et al.

(10) Patent No.: US 11,907,650 B2
(45) Date of Patent: *Feb. 20, 2024

(54) METHODS AND SYSTEMS FOR ARTIFICIAL INTELLIGENCE- ASSISTED DOCUMENT ANNOTATION

(71) Applicant: PwC Product Sales LLC, New York, NY (US)

(72) Inventors: Jacob T. Wilson, Castle Pines, CO (US); Joseph D. Harrington, New York, NY (US); Vinston Sundara Pandiyan Sigamani, Tampa, FL (US); Abhishek Sanghavi, Dallas, TX (US); Jayakumar Pillai, Odessa, FL (US); Benjamin Cunningham, New York, NY (US); Lindsey P. Lewis, Dallas, TX (US)

(73) Assignee: PwC Product Sales LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/861,805

(22) Filed: Jul. 11, 2022

(65) Prior Publication Data
US 2023/0052372 A1    Feb. 16, 2023

Related U.S. Application Data

(63) Continuation of application No. 17/402,338, filed on Aug. 13, 2021, now Pat. No. 11,443,102.

(51) Int. Cl.
*G06F 40/169* (2020.01)
*G06F 16/93* (2019.01)
*G06F 3/0482* (2013.01)

(52) U.S. Cl.
CPC .......... *G06F 40/169* (2020.01); *G06F 3/0482* (2013.01); *G06F 16/93* (2019.01)

(58) Field of Classification Search
CPC ....... G06F 40/169; G06F 16/93; G06F 3/0482
USPC ........................................................ 715/230
See application file for complete search history.

(56) References Cited

U.S. PATENT DOCUMENTS

| 8,849,725 B2 | 9/2014 | Duan et al. |
| 8,914,279 B1 | 12/2014 | Petrov et al. |
| 9,990,639 B1 | 6/2018 | Kong et al. |
| 10,268,684 B1 | 4/2019 | Denkowski et al. |

(Continued)

OTHER PUBLICATIONS (Jan. 10, 2020) "Operationalize Spark-built machine learning models," located at https://docs.microsoft.com/en-us/azure/machine-learning/team-data-science-process/spark-model-consumption, visited on May 10, 2021. (19 pages).

(Continued)

*Primary Examiner* — Stephen S Hong
*Assistant Examiner* — Nicholas Hasty
(74) *Attorney, Agent, or Firm* — Morrison & Foerster LLP

(57) ABSTRACT

Methods and systems for artificial intelligence (AI)-assisted document annotation and training of machine learning-based models for document data extraction are described. The methods and systems described herein take advantage of a continuous machine learning approach to create document processing pipelines that provide accurate and efficient data extraction from documents that include structured text, semi-structured text, unstructured text, or any combination thereof.

20 Claims, 33 Drawing Sheets

(56) References Cited

U.S. PATENT DOCUMENTS

| | | |
|---|---|---|
| 10,853,574 B2 | 12/2020 | Galitsky |
| 10,878,234 B1 | 12/2020 | Adam et al. |
| 10,956,790 B1 | 3/2021 | Victoroff et al. |
| 11,182,693 B2 | 11/2021 | Brunn et al. |
| 2007/0174247 A1 | 7/2007 | Xu et al. |
| 2014/0046877 A1 | 2/2014 | Gopalakrishnan et al. |
| 2016/0162458 A1 | 6/2016 | Munro et al. |
| 2018/0144042 A1 | 5/2018 | Sheng et al. |
| 2019/0005020 A1 | 1/2019 | Gregory et al. |
| 2019/0251182 A1 | 8/2019 | Ray et al. |
| 2020/0019769 A1 | 1/2020 | Leibovitz et al. |
| 2020/0175015 A1 | 6/2020 | Al Hasan et al. |
| 2020/0226431 A1 | 7/2020 | Zeiler et al. |
| 2020/0286002 A1 | 9/2020 | Szanto et al. |
| 2021/0019665 A1 | 1/2021 | Gur et al. |
| 2021/0064860 A1* | 3/2021 | Tuma ................. G06F 16/93 |
| 2021/0125034 A1 | 4/2021 | Nguyen et al. |
| 2021/0133438 A1* | 5/2021 | Florencio ............ G06V 30/412 |
| 2021/0192126 A1 | 6/2021 | Gehrmann et al. |
| 2021/0216595 A1 | 7/2021 | Walia et al. |
| 2021/0248323 A1 | 8/2021 | Maheshwari et al. |
| 2022/0050967 A1 | 2/2022 | Veyseh et al. |
| 2022/0229984 A1 | 7/2022 | Miao et al. |
| 2023/0049167 A1 | 2/2023 | Wilson et al. |

OTHER PUBLICATIONS (Jan. 10, 2020) "Scalable Data Science with Azure Data Lake: An end-to-end Walkthrough," located at https://docs.microsoft.com/en-us/azure/machine-learning/team-data-science-process/data-lake-walkthrough, visited on May 10, 2021. (38 pages).

Crammer et al. (Mar. 2006). "Online Passive-Aggressive Algorithms," Journal of Machine Learning Research 7: 551-585.

Wilson et al., U.S. Office Action dated Sep. 12, 2022, directed to U.S. Appl. No. 17/402,333; 26 pages.

Wilson et al., U.S. Office Action dated Dec. 10, 2021, directed to U.S. Appl. No. 17/402,338; 11 pages.

Wilson et al., U.S. Office Action dated Jan. 3, 2022, directed to U.S. Appl. No. 17/402,333; 18 pages.

Wilson et al., U.S. Office Action dated Mar. 28, 2022, directed to U.S. Appl. No. 17/402,333; 22 pages.

International Search Report and Written Opinion dated Jan. 19, 2023, directed to International Application No. PCT/US2022/074685; 10 pages.

* cited by examiner

FIG. 8

| Task ID ↕ | Task Type ↕ | File Name ↕ | Assignee ↕ | Status ↕ | Predictions Completed ↕ | Date Modified ↕ | Actions |
|---|---|---|---|---|---|---|---|
| All Tags | | | | All Statuses ▾ | All Tasks ▾ | | |
| 123359 | Training | 5-YEAR CREDIT AGREEMENT, DATED AUGUST 1,2018.pdf | Lindsey Lewis | ○ Not Started | No | 05/19/21 3:46 PM | ○ : |
| 123356 | Training | ManagementAgreementEX-10.2.pdf | Lindsey Lewis | ○ Not Started | No | 05/19/21 3:44 PM | ○ : |
| 123357 | Training | Sample Input - SOW Standard Contracts6.pdf | Lindsey Lewis | ○ Not Started | No | 05/19/21 3:43 PM | ○ : |
| 121966 | Training | 5-YEAR CREDIT AGREEMENT, DATED AUGUST 1,2018.pdf | Lindsey Lewis | ◐ In Progress | Yes | 05/19/21 9:55 PM | ○ : |
| 117933 | Training | Sample Input - SOW Standard Contracts6.pdf | Lindsey Lewis | ● Completed | No | 05/19/21 3:47 PM | ○ : |
| 113307 | Training | Sample Input - SOW Standard Contracts6.pdf | Lindsey Lewis | ○ Not Started | Yes | 05/19/21 8:03 PM | ○ : |
| 113303 | Training | 5-YEAR CREDIT AGREEMENT, DATED AUGUST 1,2018.pdf | Lindsey Lewis | ● Approved without Training | Yes | 05/17/21 9:57 PM | ○ : |
| 112297 | Training | Sample Input - SOW Standard Contracts6.pdf | Lindsey Lewis | ◐ In Progress | No | 05/17/21 10:17 PM | ○ : |
| 110813 | Training | 5-YEAR CREDIT AGREEMENT, DATED AUGUST 1,2018.pdf | Lindsey Lewis | ● Approved for Training | Yes | 04/02/21 8:57 AM | ○ : |
| 109756 | Training | Sample Input - SOW Standard Contracts6.pdf | Lindsey Lewis | ◐ In Progress | Yes | 03/15/21 5:24 PM | ⊘ : |
| 109178 (Tag 1) | Training | Sample Input - SOW Standard Contracts6.pdf | Lindsey Lewis | ◐ In Progress | Yes | 03/11/21 9:16 AM | ⊘ : |
| 109057 | Training | Sample Input - SOW Standard Contracts6.pdf | Lindsey Lewis | ● Approved for Training | Yes | 03/08/21 4:20 PM | ○ : |
| 108959 | Training | 5-YEAR CREDIT AGREEMENT, DATED AUGUST 1,2018.pdf | Lindsey Lewis | ● Approved for Training | Yes | 03/15/21 5:42 PM | ○ : |
| 108637 | Training | Sample Input - SOW Standard Contracts6 copy.pdf | Lindsey Lewis | ○ Not Started | Yes | 03/05/21 9:11 PM | ○ : |
| 107115 | Training | ManagementAgreementEX-10.2.pdf | Lindsey Lewis | ● Approved for Training | No | 05/17/21 6:49 PM | ○ : |
| 107114 | Training | Sample Input - SOW Standard Contracts6.pdf | Lindsey Lewis | ✗ Rejected | Yes | 05/19/21 3:47 PM | ○ : |
| 106325 | Training | {09301F98B-4D22-4112-BDBE-D8B7F9B084B9}_33582_c3a38bda-61ae-40e5-8a1a-13184341c4f6}.pdf | Lindsey Lewis | ○ Not Started | No | 02/16/21 9:07 PM | ○ : |

FIG. 9

| | | | | | |
|---|---|---|---|---|---|
| ☐ | 117933 | Training | Sample Input - SOW Standard Contracts6.pdf | Lindsey Lewis | ● Complete | No |
| ☐ | 113307 | Training | Sample Input - SOW Standard Contracts6.pdf | Lindsey Lewis | ○ Not Started | Yes |
| ☐ | 113303 | Training | 5-YEAR CREDIT AGREEMENT, DATED AUGUST 1.2018.pdf | Lindsey Lewis | ● Approved without Training | Yes |
| ☐ | 112297 | Training | Sample Input - SOW Standard Contracts6.pdf | Lindsey Lewis | ○ In Progress | No |
| ☐ | 110813 | Training | 5-YEAR CREDIT AGREEMENT, DATED AUGUST 1.2018.pdf | Lindsey Lewis | ● Approved for Training | Yes |
| ☐ | 109756 | Training | Sample Input - SOW Standard Contracts6.pdf | Lindsey Lewis | ○ In Progress | Yes |
| (new tag) | | | | | | |

1202

1204

- Approve Task without Training
- Approve Task for Training
- Edit Assignee
- Publish Task to Client
- Run Predictions
- Delete Task
- Reject Task

METHODS AND SYSTEMS FOR ARTIFICIAL INTELLIGENCE- ASSISTED DOCUMENT ANNOTATION

CROSS-REFERENCE TO RELATED APPLICATIONS

This application is a continuation of U.S. application Ser. No. 17/402,338, filed Aug. 13, 2021, the contents of which are incorporated herein by reference in their entirety.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present disclosure relates generally to methods and systems for document annotation, and more specifically to methods and systems for artificial intelligence-assisted document annotation.

BACKGROUND

Automated extraction of information from documents, such as business invoices, tax return forms, or legal contracts, is of increasing importance in both the private and public sectors in order to improve document processing efficiencies and to harness the power of "big data" analytics for identifying patterns and forecasting trends in large data sets. Historically, the extraction of information from large collections of documents has required laborious manual review and data entry, the use of highly structured business, tax, or legal forms as input, and/or manual annotation of sets of documents to create training data sets that can be used to train machine learning models for document data extraction. Accordingly, there remains a need for improved methods and systems that provide a streamlined approach to annotating documents and training machine learning-based data extraction models that are capable of accurate and efficient data extraction from documents that include structured text, semi-structured text, unstructured text, or any combination thereof, and that can be rapidly scaled to handle input data sets comprising tens- to hundreds-of-thousands of documents.

BRIEF SUMMARY OF THE INVENTION

Disclosed herein are methods and systems for document annotation and training of machine learning-based models for document data extraction. The disclosed methods and systems take advantage of a distributed continuous machine learning approach to create document processing pipelines that provide accurate and efficient data extraction from documents that include structured text, semi-structured text, unstructured text, or any combination thereof. In some instances, the document data extraction pipelines may comprise a plurality of trained term-based machine learning models selected from a central repository. In some instances, the document data extraction pipelines may comprise a plurality of term-based machine learning models that have optionally been trained and/or tuned for a specific user's application. In some instances, the document data extraction pipelines may further incorporate optical character recognition and/or template-based extraction capabilities as well. Furthermore, the document data extraction pipelines disclosed herein may be implemented using a cloud-based distributed computing infrastructure that provides for rapid and dynamic scaling to handle input data sets comprising tens- to hundreds-of-thousands of documents.

Disclosed herein are computer-implemented methods for annotating an electronic document comprising: displaying, within a first region of a graphical user interface, an electronic document, or a page therefrom; displaying, within a second region of the graphical user interface, a list of suggested labels that may be applicable to categories of text within the electronic document; receiving a first input from a user indicating a selection of text within the first region of the graphical user interface; receiving a second input from the user to assign a label from the list of suggested labels to the selected text; displaying, within the first region of the graphical user interface, a graphic element comprising the assigned label and the selected text, wherein the graphic element is adjacent to, or overlaid on, a location of the selected text; and storing the assigned label, the selected text, and the location of the selected text for one or more instances of selected text within the electronic document as an annotated electronic document.

In some embodiments, the computer-implemented method further comprises displaying, within the first region of the graphical user interface, suggested selections of text that may correspond to the suggested labels. In some embodiments, the computer-implemented method further comprises repeating the receiving steps for the first user input and the second user input for one or more additional selections of text and assigned labels. In some embodiments, the computer-implemented method further comprises receiving a third input from the user to assign a custom label to the selection of text. In some embodiments, the selected text comprises a word, a phrase, a sentence, a paragraph, a section, or a table. In some embodiments, the list of suggested labels comprises a list of text categories that includes name, date, execution date, effective date, expiration date, delivery date, due date, date of sale, order date, invoice date, issuance data, address, address line 1, street address, quantity, amount, cost, cost of goods sold, signature, or any combination thereof. In some embodiments, the computer-implemented method further comprises displaying, within a third region of the graphical user interface, a list of selected text grouped according to assigned label. In some embodiments, the computer-implemented method further comprises repeating the method for one or more additional electronic documents and storing the one or more additional annotated electronic documents. In some embodiments, the computer-implemented method further comprises using the stored annotated electronic documents as training data to train a machine learning model to automatically predict and extract selections of text corresponding to one or more labels from non-annotated electronic documents. In some embodiments, the computer-implemented method further comprises: using the trained machine learning model to predict selections of text corresponding to the one or more labels from one or more non-annotated validation electronic documents; sequentially displaying each of the one or more validation electronic documents, or pages therefrom, in the first region of the graphical user interface, wherein the predictions of text corresponding to the one or more labels are graphically highlighted; sequentially receiving feedback from the user on accuracy of the predicted selections of text corresponding to the one or more labels in each of the one or more validation electronic documents; and approving or correcting each of the one or more validation electronic documents according to the feedback from the user. In some embodiments, the computer-implemented method further comprises retraining the machine learning model using the one or more approved or corrected validation electronic documents.

Disclosed herein are computer-implemented methods for annotating an electronic document comprising: displaying, within a first region of a graphical user interface, an electronic document, or a page therefrom; displaying, within a second region of the graphical user interface, a list of suggested labels that may be applicable to categories of text within the electronic document; displaying with the first region of the graphical user interface, suggested selections of text that may correspond to a label from the list of the suggested labels; displaying, within the first region of the graphical user interface, a graphic element comprising a suggested label from the list of suggested labels and a selection of text from the suggested selections of text, wherein the graphic element is adjacent to, or overlaid on, a location of the selection of text; receiving a first input from a user indicating whether the suggested label correctly describes the selection of text; storing the suggested label, the selection of text, and the location for the selection of text within the electronic document as an annotated electronic document if the suggested label correctly describes the selection of text. In some embodiments, the computer-implemented method further comprises receiving a second user input to correct the suggested label so that it correctly describes the selection of text.

Disclosed herein are systems comprising: one or more processors; a memory; an electronic display device; and one or more programs, wherein the one or more programs are stored in the memory and configured to be executed by the one or more processors, the one or more programs including instructions for: displaying, within a first region of a graphical user interface, an electronic document, or a page therefrom; displaying, within a second region of the graphical user interface, a list of suggested labels that may be applicable to categories of text within the electronic document; receiving a first input from a user indicating a selection of text within the first region of the graphical user interface; receiving a second input from the user to assign a label from the list of suggested labels to the selected text; displaying, within the first region of the graphical user interface, a graphic element comprising the assigned label and the selected text, wherein the graphic element is adjacent to, or overlaid on, a location of the selected text; and storing the assigned label, the selected text, and the location of the selected text for one or more instances of selected text within the electronic document as an annotated electronic document.

In some embodiments, the instructions further comprise displaying within the first region of the graphical user interface, suggested selections of text that may correspond to the suggested labels. In some embodiments, the instructions further comprise repeating the receiving steps for the first user input and the second user input for one or more additional selections of text and assigned labels. In some embodiments, the instructions further comprise receiving a third input from the user to assign a custom label to the selection of text. In some embodiments, the selected text comprises a word, a phrase, a sentence, a paragraph, a section, or a table. In some embodiments, the list of suggested labels comprises a list of text categories that includes name, date, execution date, effective date, expiration date, delivery date, due date, date of sale, order date, invoice date, issuance data, address, address line 1, street address, quantity, amount, cost, cost of goods sold, signature, or any combination thereof. In some embodiments, the instructions further comprise displaying, within a third region of the graphical user interface on the electronic display, a list of selected text grouped according to assigned label. In some embodiments, the instructions further comprise repeating the displaying and receiving steps for one or more additional electronic documents and storing one or more additional annotated electronic documents. In some embodiments, the instructions further comprise using the stored annotated electronic documents as training data to train a machine learning model to automatically predict and extract selections of text corresponding to one or more labels from non-annotated electronic documents. In some embodiments, the instructions further comprise: using the trained machine learning model to predict selections of text corresponding to the one or more labels from one or more non-annotated validation electronic documents; sequentially displaying each of the one or more validation electronic documents, or pages therefrom, in the first region of the graphical user interface, wherein the predicted selections of text corresponding to the one or more labels are graphically highlighted; sequentially receiving feedback from the user on accuracy of the predicted selections of text corresponding to the one or more labels in each of the one or more validation electronic documents; and approving or correcting the one or more validation electronic documents according to the feedback from the user. In some embodiments, the instructions further comprise retraining the machine learning model using the one or more approved or corrected validation electronic documents.

Also disclosed herein are non-transitory computer-readable storage medium storing one or more programs, the one or more programs comprising instructions, the instructions when executed by one or more processors of a computing platform, cause the computing platform to: display, within a first region of a graphical user interface, an electronic document, or a page therefrom; display, within a second region of the graphical user interface, a list of suggested labels that may be applicable to categories of text within the electronic document; receive a first input from a user indicating a selection of text within the first region of the graphical user interface; receive a second input from the user to assign a label from the list of suggested labels to the selected text; display, within the first region of the graphical user interface, a graphic element comprising the assigned label and the selected text, wherein the graphic element is adjacent to, or overlaid on, a location of the selected text; and store the assigned label, the selected text, and the location of the selected text for one or more instances of selected text within the electronic document as an annotated electronic document.

In some embodiments, the instructions further comprise displaying within the first region of the graphical user interface, suggested selections of text that may correspond to the suggested labels. In some embodiments, the instructions further comprise repeating the receiving steps for the first user input and the second user input for one or more additional selections of text and assigned labels. In some embodiments, the instructions further comprise receiving a third input form the user to assign a custom label to the selection of text. In some embodiments, the instructions further cause the computing platform to store annotated electronic documents as part of a training data set to train a machine learning model to automatically predict and extract selections of text corresponding to one or more labels from non-annotated electronic documents. In some embodiments, the instructions further cause the computing platform to: use the trained machine learning model to predict selections of text corresponding to the one or more labels from one or more non-annotated validation electronic documents; sequentially display each of the one or more validation electronic documents, or pages therefrom, in the first region of the graphical user interface, wherein the predicted selections of text corresponding to the one or more labels are graphically highlighted; sequentially receive feedback from the user on accuracy of the predicted selections of text corresponding to the one or more labels in each of the one or more validation electronic documents; and approve or correct the one or more validation electronic documents according to the feedback from the user.

Disclosed herein are computer-implemented method for automated document data extraction comprising: providing a plurality of machine learning models, wherein each machine learning model of the plurality is selected based on a type of electronic document and is trained to extract text corresponding to one or more labels for that type of electronic document; receiving a plurality of electronic documents; processing the plurality of electronic documents using the plurality of machine learning models to extract text corresponding to the one or more labels for which each machine learning model of the plurality has been trained; and outputting the extracted text.

In some embodiments, the machine learning models of the plurality are automatically selected based on the type of electronic document. In some embodiments, the plurality of machine learning models comprise supervised learning models. In some embodiments, at least one of the machine learning models of the plurality is selected from a central repository of trained machine learning models. In some embodiments, at least one of the machine learning models of the plurality is trained to extract text corresponding to one or more labels in annotated electronic documents provided by a user. In some embodiments, the plurality of machine learning models are continuously trained as additional annotated documents are provided by one or more users. In some embodiments, the plurality of electronic documents comprise structured text, semi-structured text, unstructured text, or any combination thereof. In some embodiments, the extracted text comprises a word, a phrase, a sentence, a paragraph, a section, a table, or any combination thereof. In some embodiments, each of the one or more labels comprises a text category. In some embodiments, the text category is a name, date, execution date, effective date, expiration date, delivery date, due date, date of sale, order date, invoice date, issuance data, address, address line 1, street address, quantity, amount, cost, cost of goods sold, or signature. In some embodiments, a total number of labels for which corresponding text is extracted is configured by a user when the machine learning models are selected and trained. In some embodiments, a total number of machine learning models used to extract text is configured by a user when the machine learning models are selected and trained. In some embodiments, the computer-implemented method further comprises performing optical character recognition (OCR) on one or more documents of the plurality of electronic documents. In some embodiments, the computer-implemented method further comprises performing template-based extraction of text from one or more documents of the plurality of electronic documents. In some embodiments, the electronic documents of the plurality are processed by each of the machine learning models of the plurality in series. In some embodiments, the electronic documents of the plurality are processed by each of the machine learning models of the plurality in parallel. In some embodiments, the method is implemented on a computing platform that is configured to dynamically scale the processing of the plurality of electronic documents according to a number of electronic documents in the plurality. In some embodiments, the number of electronic documents in the plurality is at least 1,000. In some embodiments, the method is implemented on a distributed cloud-based computing platform.

Also disclosed herein are systems for automated document data extraction comprising: one or more processors; memory, a plurality of machine learning models stored in memory, wherein each machine learning model of the plurality has been trained to extract text corresponding to one or more labels based on a type of electronic document; and one or more programs stored in the memory that, when executed by the one or more processors, cause the computing system to: receive, using the one or more processors, a plurality of electronic documents; select one or more machine learning models from the plurality of machine learning models based on the type of electronic documents received; process the plurality of electronic documents using the one or more machine learning models to extract text corresponding to the one or more labels for which each of the one or more machine learning models has been trained; and output the extracted text.

In some embodiments, the selection of the one or more machine learning models from the plurality of machine learning models based on the type of electronic documents received is automatic. In some embodiments, the one or more machine learning models comprise supervised learning models. In some embodiments, at least one of the machine learning models is trained to extract text corresponding to one or more labels in annotated electronic documents provided by a user. In some embodiments, one or more machine learning models are continuously trained as additional annotated documents are provided by one or more users. In some embodiments, the plurality of electronic documents comprise structured text, semi-structured text, unstructured text, or any combination thereof. In some embodiments, each of the one or more labels comprises a text category. In some embodiments, the extracted text comprises a word, a phrase, a sentence, a paragraph, a section, a table, or any combination thereof. In some embodiments, a total number of machine learning models used to extract text is configured by a user when the machine learning models are selected and trained. In some embodiments, the method is implemented on a computing platform that is configured to dynamically scale the processing of the plurality of electronic documents according to a number of electronic documents in the plurality.

Disclosed herein are non-transitory computer-readable storage medium storing one or more programs, the one or more programs comprising instructions, the instructions when executed by one or more processors of a computing platform, cause the computing platform to: receive a plurality of electronic documents; process the plurality of electronic documents using a plurality of machine learning models, wherein each machine learning model of the plurality is selected based on a type of electronic document and is trained to extract text corresponding to one or more labels for that type of electronic document; and output the extracted text.

INCORPORATION BY REFERENCE

All publications, patents, and patent applications mentioned in this specification are herein incorporated by reference in their entirety to the same extent as if each individual publication, patent, or patent application was specifically and individually indicated to be incorporated by reference in its entirety. In the event of a conflict between a term herein and a term in an incorporated reference, the term herein controls.

BRIEF DESCRIPTION OF THE DRAWINGS

Various aspects of the disclosed methods, devices, and systems are set forth with particularity in the appended claims. A better understanding of the features and advantages of the disclosed methods, devices, and systems will be obtained by reference to the following detailed description of illustrative embodiments and the accompanying drawings, of which:

FIG. 8 provides a non-limiting example of a graphical user interface for an AI-driven document annotation and data extraction system.

FIG. 9 provides a non-limiting example of a graphical user interface for an AI-driven document annotation and data extraction system.

FIG. 12 provides a non-limiting example of a graphical user interface for an AI-driven document annotation and data extraction system.

FIG. 16 provides a non-limiting example of a graphical user interface for an AI-driven document annotation and data extraction system.

FIG. 20 provides a non-limiting example of a graphical user interface for an AI-driven document annotation and data extraction system.

FIG. 21 provides a non-limiting example of a graphical user interface for an AI-driven document annotation and data extraction system.

DETAILED DESCRIPTION

Figure 1:
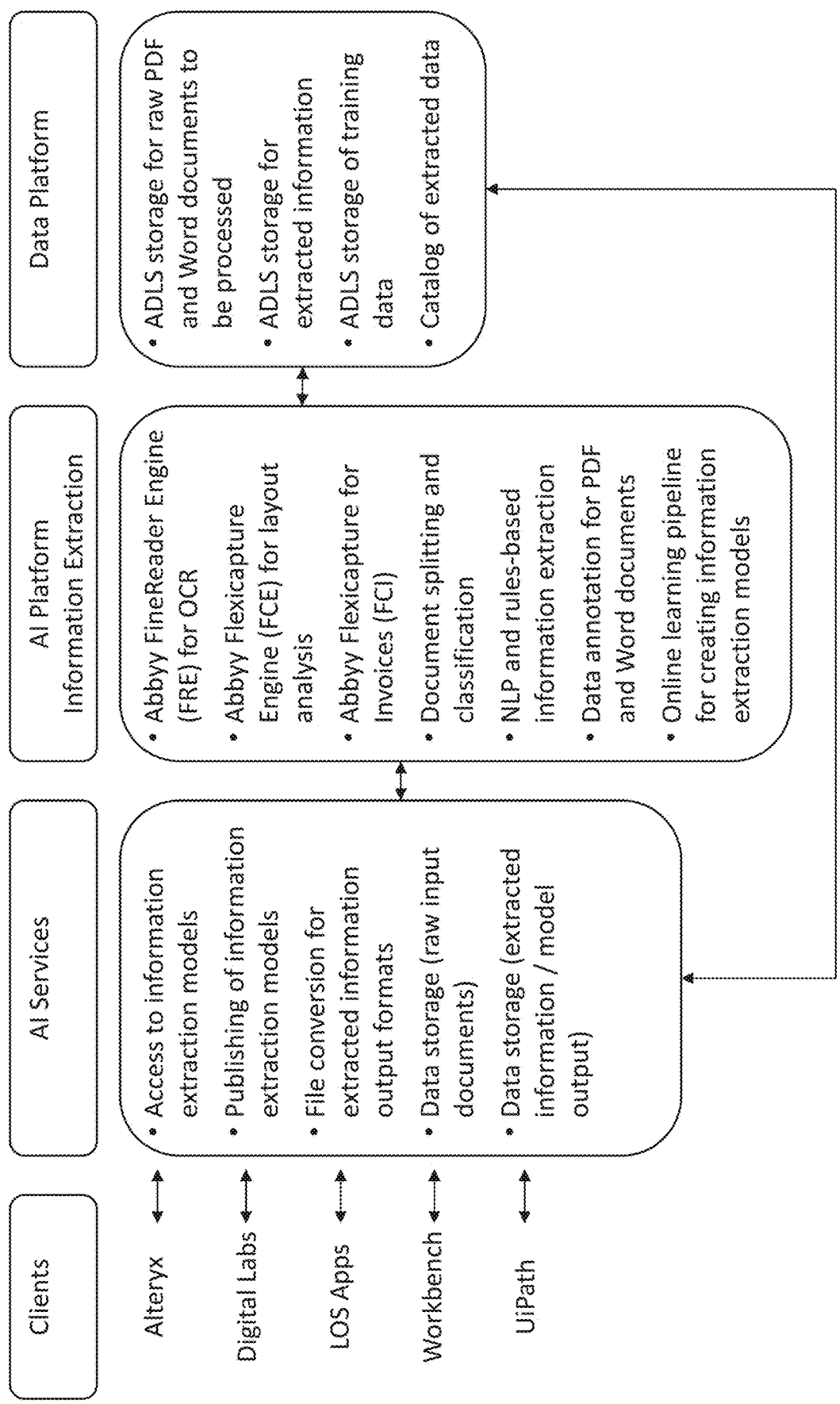
FIG. 1 provides a non-limiting schematic illustration of an artificial intelligence (AI) platform for providing AI-driven document annotation services to a plurality of clients.

Disclosed herein are methods and systems for document annotation and training of machine learning-based models for document data extraction. The disclosed methods and systems take advantage of a distributed continuous machine learning approach to create document processing pipelines that provide accurate and efficient data extraction from documents that include structured text, semi-structured text, unstructured text, or any combination thereof. In some instances, the document data extraction pipelines may comprise a plurality of trained term-based machine learning models selected from a central repository. In some instances, the document data extraction pipelines may comprise a plurality of term-based machine learning models that have optionally been trained and/or tuned for a specific user's application. In some instances, the document data extraction pipelines may further incorporate optical character recognition and/or template-based extraction capabilities as well. Furthermore, the document data extraction pipelines disclosed herein can be implemented using a cloud-based distributed computing infrastructure that provides for rapid and dynamic scaling to handle input data sets comprising tens- to hundreds-of-thousands of documents.

In one aspect of the disclosed methods and systems, an artificial intelligence (AI)-driven system for document annotation (e.g., electronic document annotation) is described. The AI-driven annotation system is accessed via a graphical user interface (GUI) that allows a user to create projects, assign project team responsibilities, upload electronic documents, review AI-predicted annotations (e.g., words, sentences, phrases, etc.) that match a list of user-selected terms (or labels), select one or more pre-trained term-based machine learning models from a central repository, optionally create a new term-based model or re-train ("tune") an existing model to accommodate new user-specific terms (or labels), validate the one or more term-based machine learning models to be deployed as part of a document data extraction pipeline, and optionally to publish a new or retrained model for use by others.

For example, in some instances, the AI-driven annotation system is accessed via a graphical user interface (GUI) that comprises one or more of the steps of: (i) displaying, within a first region of a graphical user interface, an electronic document, or a page therefrom; (ii) displaying, within a second region of the graphical user interface, a list of suggested labels that may be applicable to categories of text within the electronic document; (iii) receiving a first input from a user indicating a selection of text within the first region of the graphical user interface; (iv) receiving a second input from the user to assign a label from the list of suggested labels to the selected text; (v) displaying, within the first region of the graphical user interface, a graphic element comprising the assigned label and the selected text, wherein the graphic element is adjacent to, or overlaid on, a location of the selected text; and (vi) storing the assigned label, the selected text, and the locations and/or other positional features for the selected text for one or more instances of selected text within the electronic document as an annotated electronic document. In some instances, the graphical user interface further comprises displaying, within the first region of the graphical user interface, suggested selections of text that may correspond to the suggested labels.

In another example, the AI-driven annotation system is accessed via a graphical user interface (GUI) that comprises one or more of the steps of: (i) displaying, within a first region of a graphical user interface, an electronic document, or a page therefrom; (ii) displaying, within a second region of the graphical user interface, a list of suggested labels that may be applicable to categories of text within the electronic document; (iii) displaying with the first region of the graphical user interface, suggested selections of text that may correspond to a label from the list of the suggested labels; (iv) displaying, within the first region of the graphical user interface, a graphic element comprising a suggested label from the list of suggested labels and a selection of text from the suggested selections of text, wherein the graphic element is adjacent to, or overlaid on, a location of the selection of text; (v) receiving a first input from a user indicating whether the suggested label correctly describes the selection of text; and (vi) storing the suggested label, the selection of text, and the location for the selection of text and/or other positional features of the selection of text within the electronic document as an annotated electronic document if the suggested label correctly describes the selection of text. In some instances, the graphical user interface further comprises receiving a second user input to correct the suggested label so that it correctly describes the selection of text.

In another aspect of the disclosed methods and systems, document data extraction pipelines that utilize a distributed continuous machine learning approach for automated data extraction from input data sets comprising tens- to hundreds-of-thousands of documents are described, along with the distributed computing platform infrastructure used to enable dynamic scaling of the data extraction pipeline's document processing capabilities.

For example, in some instances, the methods and systems for automated document data extraction described herein comprise one or more of the steps of: (i) providing a plurality of machine learning models, wherein each machine learning model of the plurality is selected based on a type of electronic document and is trained to extract text corresponding to one or more labels for that type of electronic document; (ii) receiving a plurality of electronic documents; (iii) processing the plurality of electronic documents using the plurality of machine learning models to extract text corresponding to the one or more labels for which each machine learning model of the plurality has been trained; and (iv) outputting the extracted text. In some instances, the machine learning models of the plurality are automatically selected based on the type of electronic document.

Definitions: Unless otherwise defined, all of the technical terms used herein have the same meaning as commonly understood by one of ordinary skill in the art in the field to which this disclosure belongs.

As used in this specification and the appended claims, the singular forms "a", "an", and "the" include plural references unless the context clearly dictates otherwise. Any reference to "or" herein is intended to encompass "and/or" unless otherwise stated.

As used herein, the terms "comprising" (and any form or variant of comprising, such as "comprise" and "comprises"), "having" (and any form or variant of having, such as "have" and "has"), "including" (and any form or variant of including, such as "includes" and "include"), or "containing" (and any form or variant of containing, such as "contains" and "contain"), are inclusive or open-ended and do not exclude additional, unrecited additives, components, integers, elements or method steps.

As used herein, the term "machine learning" may refer to the use of any of a variety of algorithms known to those of skill in the art that may be trained to process input data and map it to a learned output, e.g., a prediction, decision, control signal, or set of instructions. In some instances, the term "artificial intelligence" may be used interchangeably with the term "machine learning".

As used herein, the term "cloud" refers to shared or sharable storage of software and/or electronic data using, e.g., a distributed network of computer servers. In some instances, the cloud may be used, e.g., for archiving electronic data, sharing electronic data, and analyzing electronic data using one or more software packages residing locally or in the cloud.

The section headings used herein are for organizational purposes only and are not to be construed as limiting the subject matter described.

Document Data Extraction:

As noted above, automated extraction of information from documents, such as business invoices, tax return forms, or legal contracts, is of increasing importance in both the private and public sectors in order to improve document processing efficiencies and to harness the power of "big data" analytics for identifying patterns and forecasting trends in large data sets. The development of automated tools for document data extraction is complicated by the fact that business and legal documents usually include a combination of structured, semi-structured, and unstructured text.

Recently, machine learning techniques have been applied to the challenge of extracting data from documents, however, the training of machine learning data extraction models requires the input of labeled training data (e.g., a set of annotated documents), and most state-of-the-art enterprise annotation tools still lack the necessary annotation accuracy required to train an accurate machine learning extraction model. Furthermore, one cannot integrate custom machine learning data extraction models with proprietary annotation tools, as the latter typically use black-box solutions to annotate data.

The disclosed methods and systems address these shortcomings by: (i) providing AI-driven document annotation tools, (ii) the capability of manually or automatically selecting pre-trained, term-based data extraction models from a central repository (e.g., based on document type), (iii) the option of training new term-based models or tuning existing term-based models for user-specific applications, and (iv) the ability to create data extraction pipelines comprising the use of sequential or parallel processing by a plurality of trained models (and, optionally, optical character recognition and template-based extraction capabilities as well) that can be implemented on distributed cloud-based computing platforms that provide for rapid and dynamic scaling to handle input data sets comprising tens- to hundreds-of-thousands of documents.

AI Platform for Providing Document Processing Services:

In some instances, the disclosed methods and systems may be deployed as part of an artificial intelligence (AI)-based enterprise services platform. FIG. 1 provides a non-limiting schematic illustration of an artificial intelligence (AI) platform for providing AI-driven document annotation services (and, optionally, other AI-driven services) to a plurality of clients. In some instances, clients (or users) of the service platform may interface and exchange data with the platform using any of a variety of custom or commercial data analytics software packages including, but not limited to, Alteryx (Irvine, CA), PwC Digital Lab (PricewaterhouseCoopers LLP, New York, NY), PwC Data Science Workbench (PricewaterhouseCoopers LLP, New York, NY), UiPath (New York, NY), loan origination system (LOS) software applications, and the like.

As illustrated in FIG. 1, non-limiting examples of AI platform services that may be accessed (e.g., through a graphical user interface) include: (i) access to information extraction models, (ii) publishing of information extraction models, (iii) file conversion for extracted information output formats, and (iv) data storage (e.g., raw input documents, extracted document information, model prediction output, etc.).

As illustrated in FIG. 1, the document information extraction platform residing within the AI service platform may comprise a variety of document processing tools, e.g., the ABBYY® FineReader Engine (FRE) for optical character recognition (OCR), the ABBYY® Flexicapture Engine (FCE) for template-based extraction, ABBYY® Flexicapture for Invoices, document splitting and classification tools, natural language processing (NPL) and rule-based information extraction tools, data annotation for PDF and Word documents, and a continuous learning pipeline for creating machine learning-based information extraction models. The ABBYY® Finereader Engine, for example, provides full page extraction of text from document images with support for 192 different languages.

As illustrated in FIG. 1, the data platform residing within the AI services platform may provide a variety of data storage options, e.g., Microsoft® Windows Azure Data Lake Storage (ADLS) storage of raw PDF or Word documents to be processed, storage of extracted information, storage of model training data, and a catalogue of extracted data.

Figure 2:
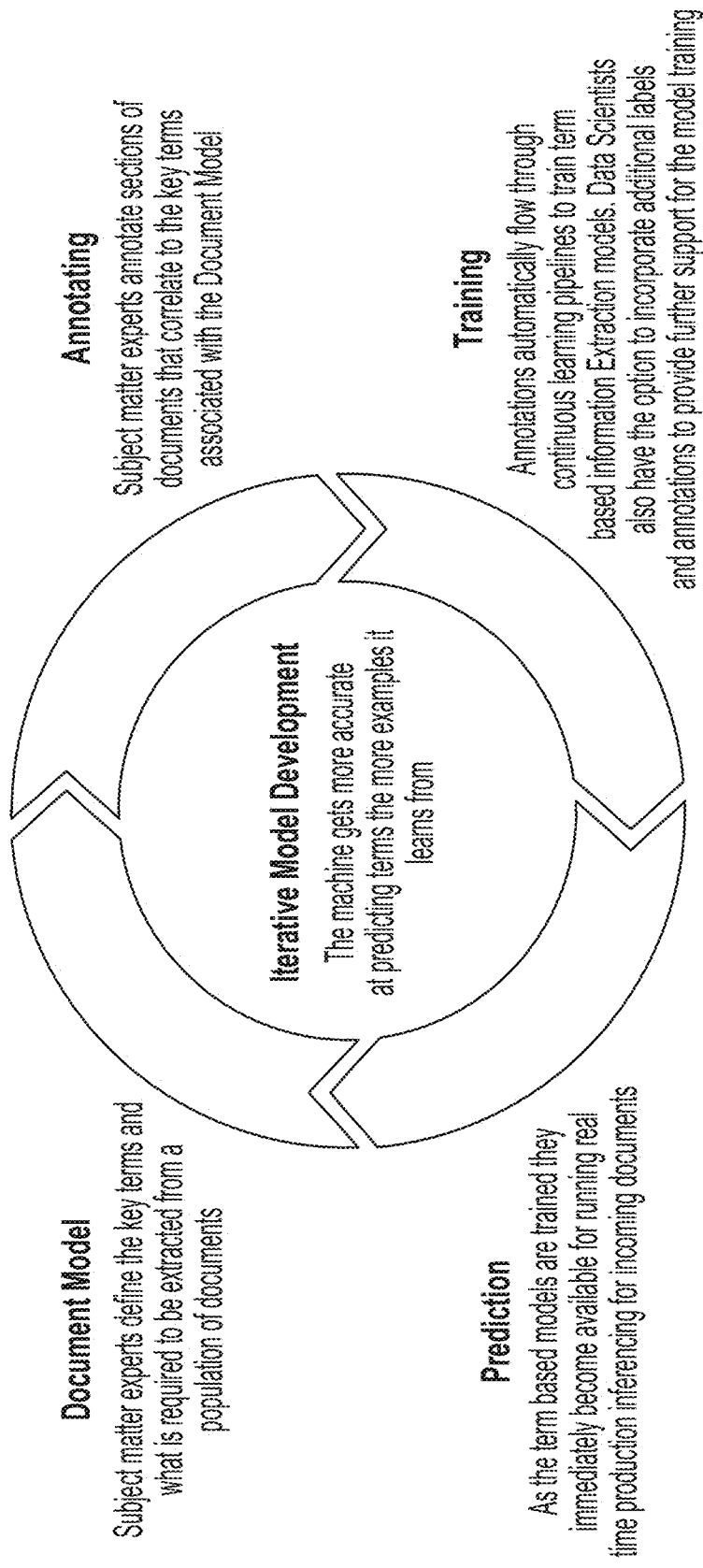
FIG. 2 provides a non-limiting schematic illustration of a continuous machine learning process for information extraction.

AI-Driven Document Annotation:

The disclosed methods and systems utilize a distributed continuous machine learning process to support iterative term-based model development. As illustrated in FIG. 2, the process includes several stages including: (i) the document extraction model definition stage (e.g., in which the client, user, or other subject matter experts define the key terms and what information is to be extracted from a given set of documents), (ii) the annotation stage (e.g., in which the client, user, or other subject matter experts annotate sections of documents that correlate with the key terms for a given term-based document data extraction model), (iii) the model training stage (e.g., in which annotations automatically flow through the continuous learning pipeline to train term-based machine learning document data extraction models), and (iv) the prediction stage (e.g., in which as term-based document extraction models are trained they become available for running real time data extraction on incoming documents). The benefit derived from implementing the disclosed continuous learning process for developing machine learning-based document data extraction models is that the models become more accurate as more examples become available for training or retraining.

As noted above, the disclosed methods and systems include AI-driven document annotation tools that provide a convenient user interface for annotating and reviewing electronic documents for use in training machine learning-based extraction models. AI-driven annotation provides users with the ability to annotate documents to create the training data used to train machine learning models for extracting information from documents such as leases, loan packages, IRS Schedule K-1 s, purchase agreements, and more. The disclosed process of creating term-based machine learning models using the AI-driven annotation application is facilitated by the following: (i) creating an annotation project for a given document type (lease, Schedule K-1, etc.), (ii) uploading documents to be annotated for the project, (iii) inviting or adding designated annotators to specific project teams, (iv) assigning annotation tasks to team annotators, (v) annotating documents, (vi) reviewing and approving the annotations submitted for model training, (vii) evaluating the information extraction performance of the trained model (precision, recall, F1), and (ix) publishing the new information extraction model to the AI platform.

Figure 3:
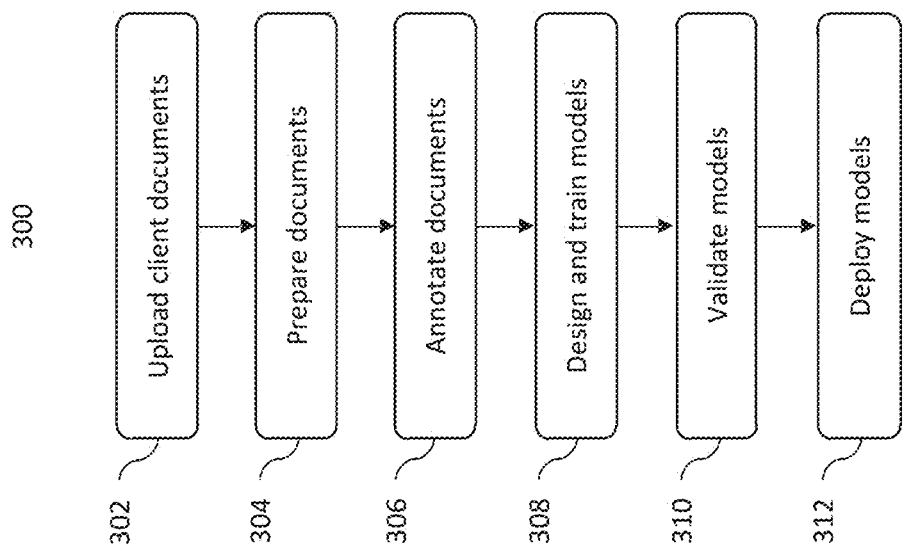
FIG. 3 provides a non-limiting example of a process flowchart for AI-driven document annotation and training of term-based machine learning models for document data extraction.

FIG. 3 provides a non-limiting example of a process flowchart for AI-driven document annotation (AIDA) and training of term-based machine learning models for document data extraction. In step 302 of process 300, a user (e.g., a client) uploads a set of electronic documents to be annotated and used as training data for training a term-based machine learning data extraction model. In step 304, the documents are prepared for annotation, e.g., by assigning client identification, project number, and/or annotation term (s) metadata, and performing optical character recognition if necessary. In step 306, one of more documents of the set of documents uploaded to the system are displayed in a graphical user interface (GUI) according to, e.g., a drop-down selection list or a display of document thumbnail images. In some instances, the system automatically highlights or otherwise graphically indicates instances of selected words, phrases, sentences, paragraphs, or tables occurring within a given document that, based on, e.g., natural language processing and/or pre-trained data extraction models, correspond to a set of one or more user-specified annotation terms. The user is able to scroll through the displayed document(s) and confirm the assignment of an indicated words, phrases, sentences, paragraphs, or tables, e.g., by clicking on the appropriate label presented in a drop down list adjacent to the highlighted term in the GUI. Annotation data (e.g., a suggested label, the selection of text, the location for the selection of text, and other model features from the OCR process) may be stored as part of the annotated electronic document. In some instances, one or more pre-trained, term-based annotation/data extraction models may be selected by the user from a central repository of pre-trained models (e.g., a model zoo). In step 308, the annotated electronic document data thus generated may optionally be used to train one or more new document data extraction model(s), e.g., one or more models that have been fine-tuned for a specific user's selected set of one or more annotation terms. In step 310, the newly trained or tuned data extraction models are validated, e.g., by using them to process a set of validation documents which have been previously been annotated, prior to deployment, 312. A cycle of annotating additional electronic documents to generate additional training data, training the one or more data extraction models, and validating them against additional sets of validation documents, may be repeated until a desired level of data extraction accuracy is achieved. Once the desired performance metrics for the trained extraction model (s) have been achieved, the one or more trained extraction models may be deployed, e.g., as part of a data extraction pipeline that has been tuned for a specific user's needs.

Figure 4:
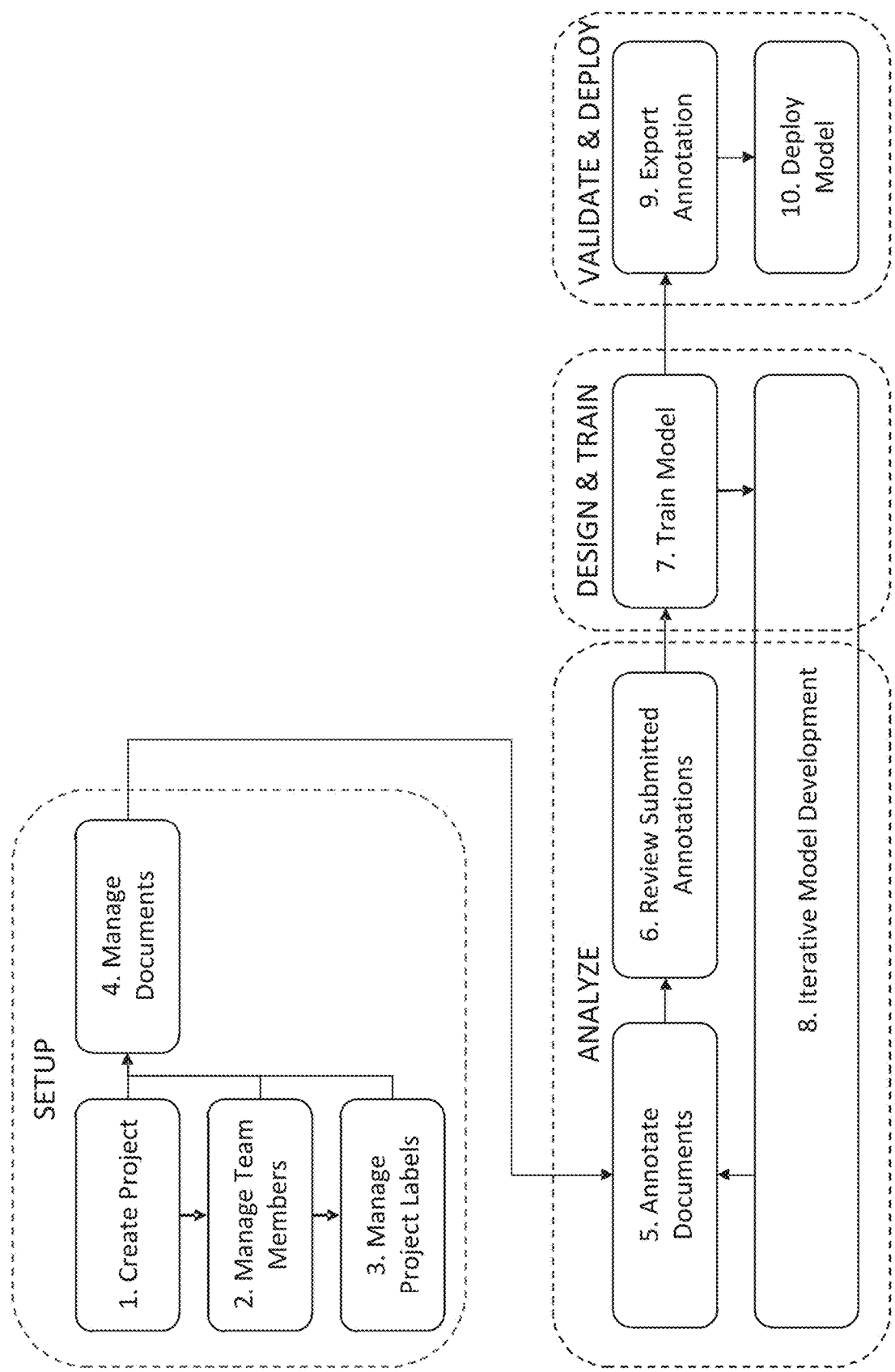
FIG. 4 provides a non-limiting example of a more detailed process flowchart for AI-driven document annotation and training of term-based machine learning models for document data extraction.

FIG. 4 provides a non-limiting example of a more detailed process flowchart for AI-driven document annotation (AIDA) and training of term-based machine learning models for document data extraction. The process illustrated in FIG. 4 comprises setup, analyze, design & train, and validate & deploy stages. During the setup stage, a user (e.g., the project owner—a client or program manager) creates projects at step 1 (e.g., provides the use case (for example, contract data extraction), the name of the document type (e.g., LIBOR), and a project description), manages team members at step 2 (e.g., the project owner can select team members or add additional team members that need access to the project by entering email addresses, and can assign roles to team members (e.g., project owner vs. annotator or client (read-only)), manages project labels (e.g., the set of terms corresponding to the information to be extracted from a set of documents) at step 3 (e.g., the project owner is able to manage the active labels for each project; they may select from a list of pre-trained default labels and/or add bespoke labels for model training), and uploads and manages documents at step 4 (e.g., upload documents and images to be annotated and/or to review and validate predictions; documents and images can be uploaded into one or many project folders; once uploaded, optical character recognition (OCR) will performed as necessary prior to annotation), along with managing the assignment of annotation tasks, etc.

Still referring to FIG. 4, during the analyze stage, the project team annotates a set of documents at step 5 (e.g., a team member assigned to a document or set of documents will be able to start their annotation session, annotate the document(s), and/or accept or reject model predictions for the document(s)), and submit the documents for review at step 6 (e.g., the project owner may review completed annotation tasks, check for accuracy, and make updates to the annotations as needed; the project owner can then approve the document(s) for model training).

As illustrated in FIG. 4, during the design & train stage, the annotated document(s) may be submitted as training data at step 7 (e.g., for auto-training of the term-based model with continuous learning via batches of annotated documents; the project owner is able to view and monitor the training results, where the output from the training process is updated model performance metrics and model predictions) for use in iterative model training at step 8 (e.g., iterative model training/tuning is conducted by repeating steps 5 to 7 to annotate additional training documents, submitting the new training data for model training, and reviewing the updated model performance metrics and predictions for the new documents).

As illustrated in FIG. 4, during the validate & deploy stage, the predicted annotations for a set of training and/or validation documents are exported at step 9 (e.g., annotations for a set of training and/or validation documents may be exported to Excel for additional review and use in downstream deliverables; the export can be performed continuously throughout the model development life cycle), followed by deployment of the model (e.g., if target performance metrics are met) at step 10 (e.g., the model may be published for updated predictions for new and existing documents within the associated project, or the model may be published for use on the central AI platform in data extraction pipelines for other projects and applications).

Figure 5:
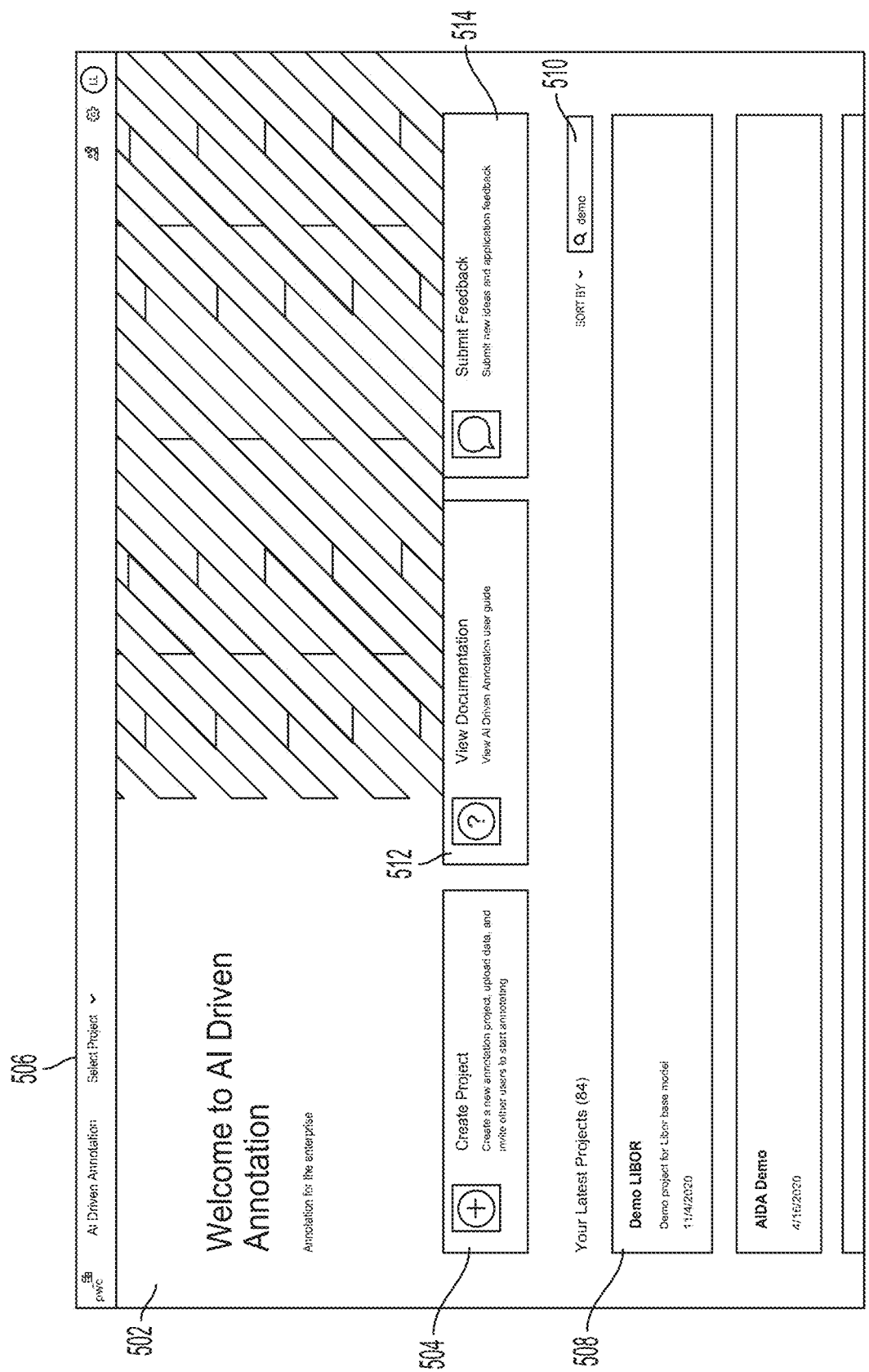
FIG. 5 provides a non-limiting example of a graphical user interface for an AI-driven document annotation and data extraction system.

FIG. 5 provides a non-limiting example of a graphical user interface for an AI-driven document annotation and data extraction system. FIG. 5 illustrates a "Welcome" screen or landing page, 502, viewed by users when they login to the system. All work performed using the system is organized within projects. By accessing the "Welcome" GUI page, users can create a new project (e.g., using button 504) or access existing projects (e.g., via a drop down menu, 506, or a listing in a region of the landing page, 508, which may be sorted, e.g., by project type using drop down menu 510). When a new project is created, a baseline information extraction template (e.g., a "Contract" extraction template) is associated with it. The baseline information extraction templates also serve as an inventory of the supported document types. Document type is usually synonymous with a project. The baseline template is used as the entry point for accessing the continuous learning engine. The landing page, 502, also allows users to view documentation such as user guides, etc. (e.g., using button 512), or to provide feedback to system developers and administrators (e.g., using button 514).

Figure 6:
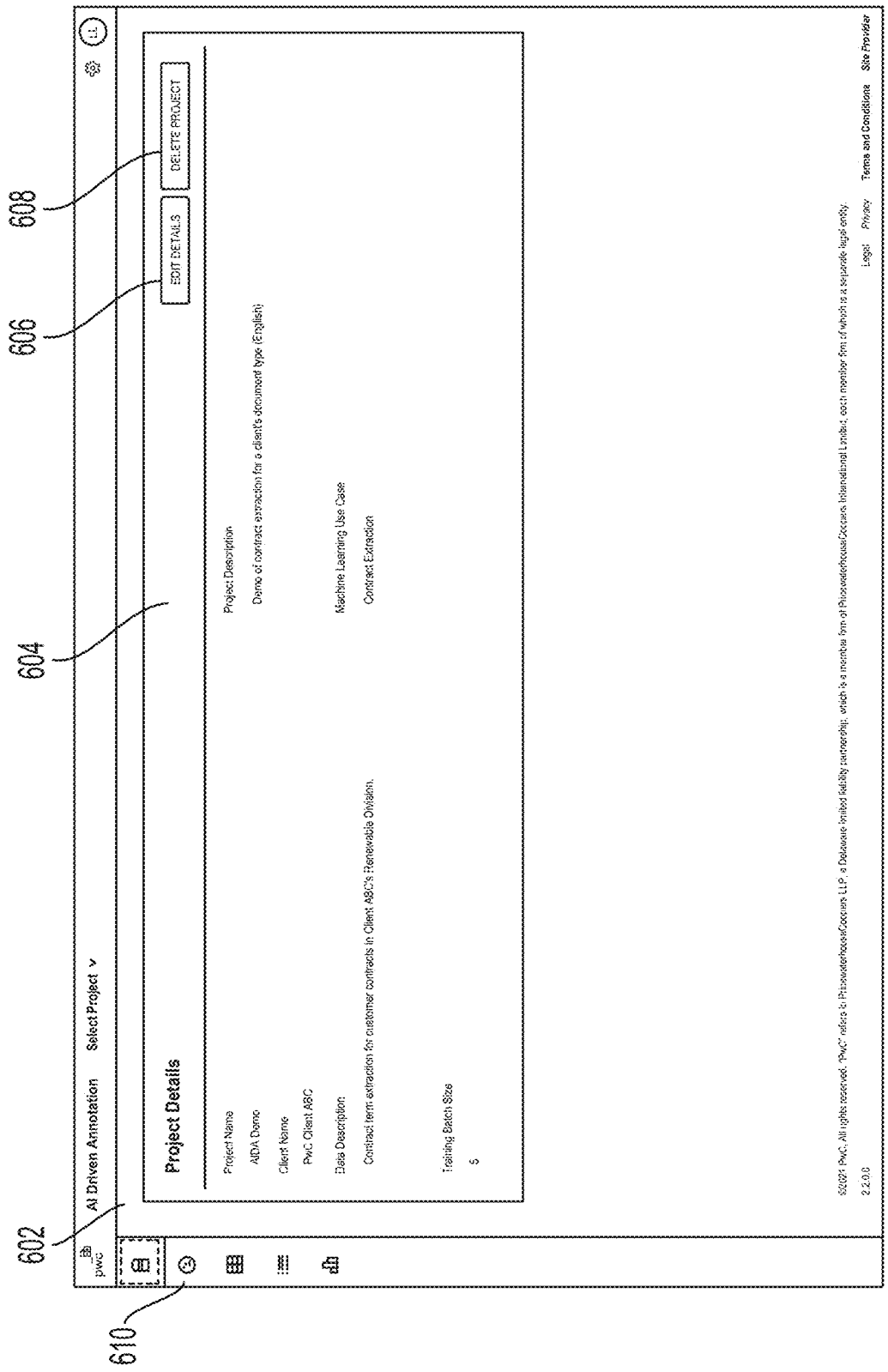
FIG. 6 provides a non-limiting example of a graphical user interface for an AI-driven document annotation and data extraction system.

FIG. 6 provides a non-limiting example of another GUI page for the disclosed AI-driven document annotation and data extraction system. The user may access a "Project Details" page, 602, by clicking into a project listed on the landing page. By accessing the "Project Details" page, users can view project information (e.g., as listed in region 604 of the GUI page). Project owners have the ability to edit project details and/or delete the project (e.g., using buttons 606 and 608). Other users (e.g., project team members, contributors, and client (read only) users) may only have the ability to view the project details. The page also provides for easy access to other GUI pages, e.g., by clicking on one of the buttons listed in region 610.

Figure 7:
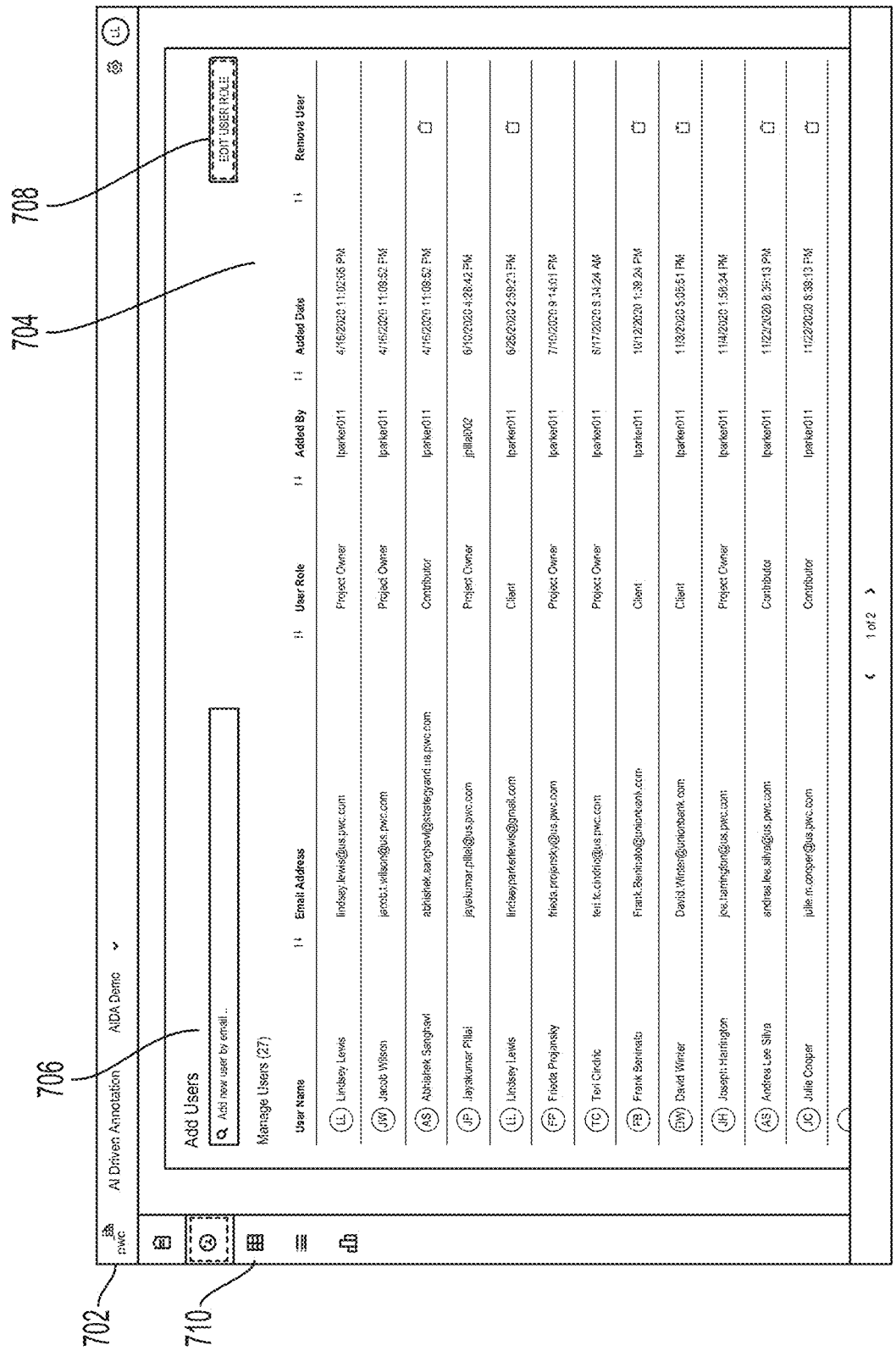
FIG. 7 provides a non-limiting example of a graphical user interface for an AI-driven document annotation and data extraction system.

FIG. 7 provides a non-limiting example of another GUI page for the disclosed AI-driven document annotation and data extraction system. The user may access a "Teams Page", 702, e.g., by clicking on one of the buttons in region 610 of the "Project Details" page shown in FIG. 6. The "Teams Page" allows the project owner to manage individual users on a project team (e.g., as listed in region 704 of the page) that will have access to the project. By accessing the "Teams Page", the project owner or other current team members can add other users (e.g., by entering a new user's email address in box 706). Project owners have ability to edit the roles for users that are added to the team, e.g., by clicking on button 708). Examples of user role permission include, but are not limited to, project owner (authorized to edit project details and delete projects, manage users, upload documents, manage all tasks assignments, create annotation labels, approve tasks for training, and publish models), contributors (authorized to upload documents, annotate documents assigned to the project, and submit annotations for approval), and client (read only) (authorized to view project details and view client published documents). The page also provides for easy access to other GUI pages, e.g., by clicking on one of the buttons listed in region 710.

Figure 8:
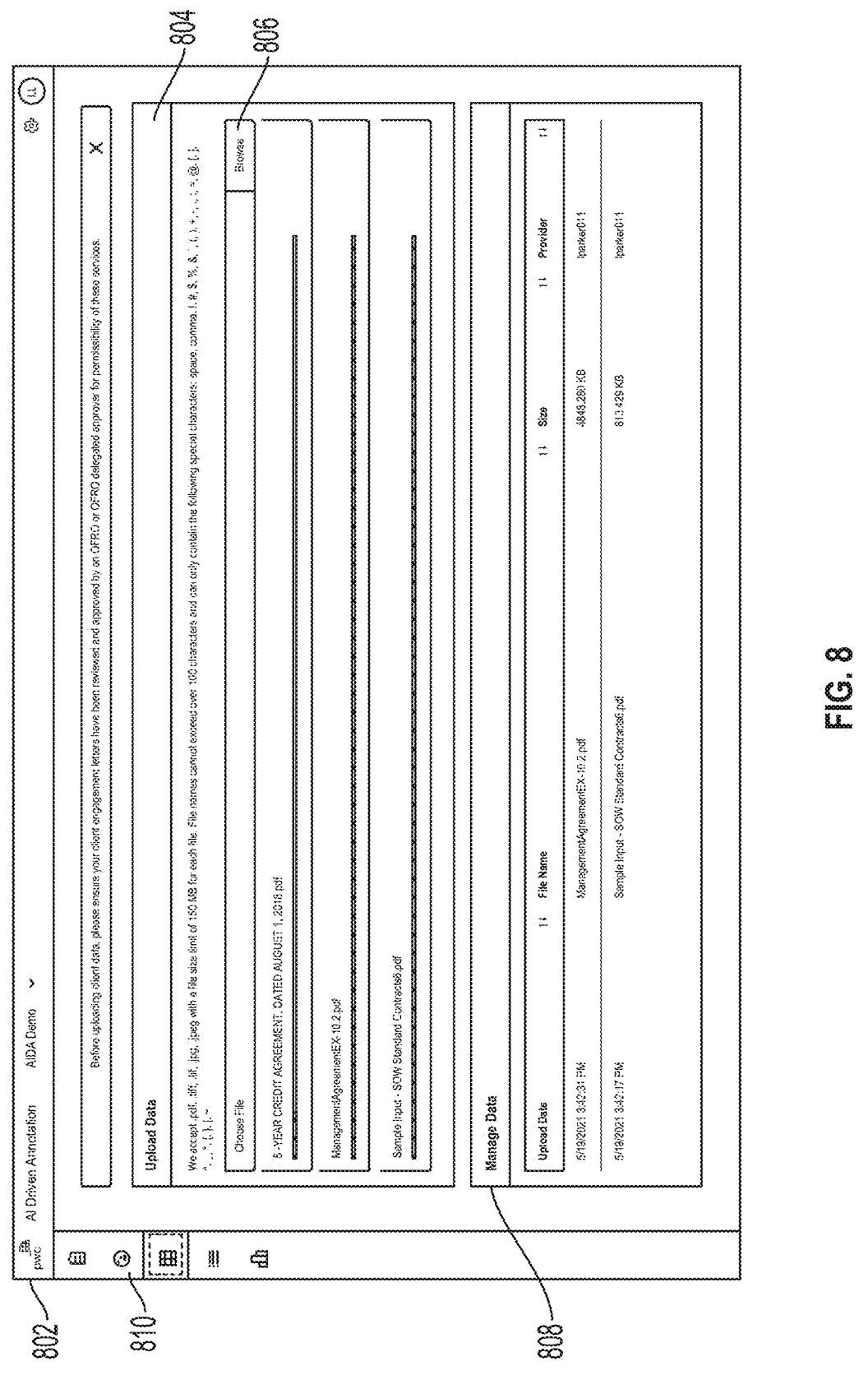

FIG. 8 provides a non-limiting example of another GUI page for the disclosed AI-driven document annotation and data extraction system. The user may access a "Datasets Page", 802, e.g., clicking on one of the buttons in region 710 of the "Teams Page" shown in FIG. 7. The "Datasets Page" allows users to upload documents into a project that will be used for machine learning and document data extraction. Once uploaded, documents may be run through an OCR process if necessary to convert the original document into a machine readable format. By accessing the "Datasets Page", users may manually upload single documents or batches of documents (e.g., by entering a file name in the text box in the "upload data" region 804, or by browsing for files using button 806; documents that may be uploaded to the system include, for example, .pdf, .tiff, or .jpeg files). The system permits secure bulk upload of client files via the Secure File Transfer Protocol (SFTP; secure application-to-application file transfer), Representational State Transfer (REST; secure application-to-application file transfer), Azure Copy (direct upload of files into core Azure Data Lake storage), or AIDA application programming interface (API) calls (REST, secure application-to-application web service calls). Uploaded documents are listed in the "manage data" region 808. The page also provides for easy access to other GUI pages, e.g., by clicking on one of the buttons listed in region 810.

FIG. 9 provides a non-limiting example of another GUI page for the disclosed AI-driven document annotation and data extraction system. The user may access a "Task Dashboard" page, 902, e.g., clicking on one of the buttons in region 810 of the "Datasets Page" shown in FIG. 8. All documents uploaded into a project will appear on the "Task Dashboard" page (e.g., as listed in region 904 of the GUI page) and assigned a unique Task ID. The "Task Dashboard" is used to manage the workflow of documents. The standard workflow for processing a document comprises the steps of: (i) document upload, (ii) OCR processing, (iii) training, and (iv) predictions processing. Document status may comprise: (i) not started, (ii) in progress, (iii) complete, and (iv) approved. By accessing the "Task Dashboard", project owners can manage task assignments by clicking on view buttons, 906, to view all or selected subsets of project tasks, or by searching by searching by Task ID or Filename using search box 908. Any team member can add comments or tags to documents and open documents. They can also export task-related information using export button 910. The page also provides for easy access to other GUI pages, e.g., by clicking on one of the buttons listed in region 912.

Figure 10:
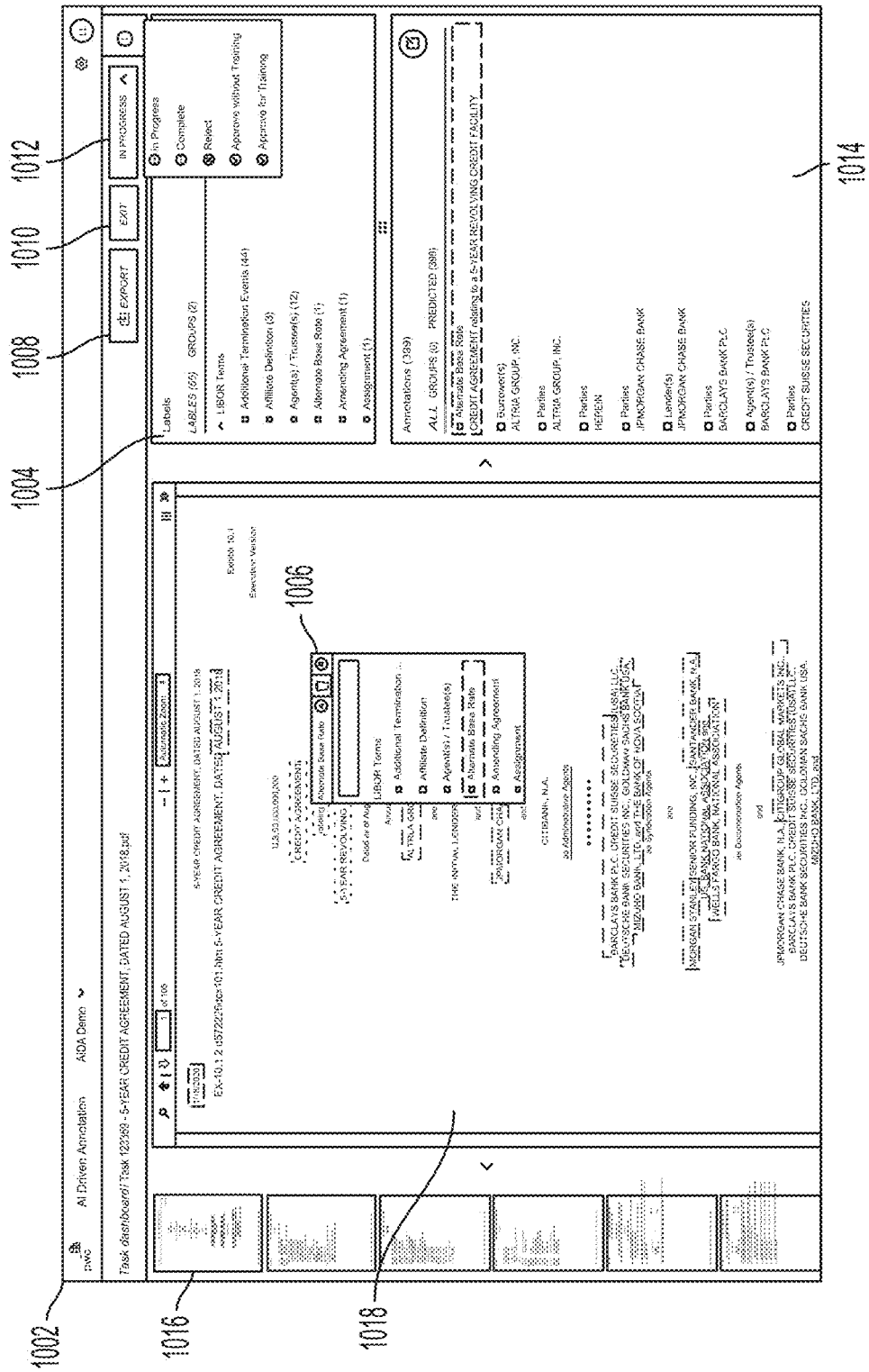
FIG. 10 provides a non-limiting example of a graphical user interface for an AI-driven document annotation and data extraction system.

FIG. 10 provides a non-limiting example of another GUI page for the disclosed AI-driven document annotation and data extraction system. The user may access a "Annotation User Interface" page, 1002, e.g., clicking on one of the buttons in region 912 of the "Task Dashboard" page shown in FIG. 9. The Annotation UI is where project team members annotate documents and where model predictions are rendered. Before annotation, labels (or tags) corresponding to the type of document data (e.g., the words, phases, structured or unstructured text, etc.) to be extracted are added to the project. All documents in the project share the same set of labels. By accessing the "Annotation User Interface" page, users can create labels (thus defining the standard data model for the project), select labels from top right panel, 1004, and make an annotation in the document and associate it with a label in popup window, 1006 (annotations will appear as highlighted text in the document). The label and annotation text pair will appear in the Annotations panel, 1014, at the bottom right. Users can edit annotations or delete annotations at any time and all actions are saved in real time. Once the document has been completely annotated, the user can mark the document status as "Complete" using drop down status menu 1012. Buttons 1008 and 1010 provide the user with annotation data export capability and annotation session exit functions, respectively. Panel 1016 displays thumbnail images of individual document pages, which allow the user to click through the document quickly. The user is also able to scroll through the document using right and left arrows displayed on each side of the current page display, 1018.

Figure 11:
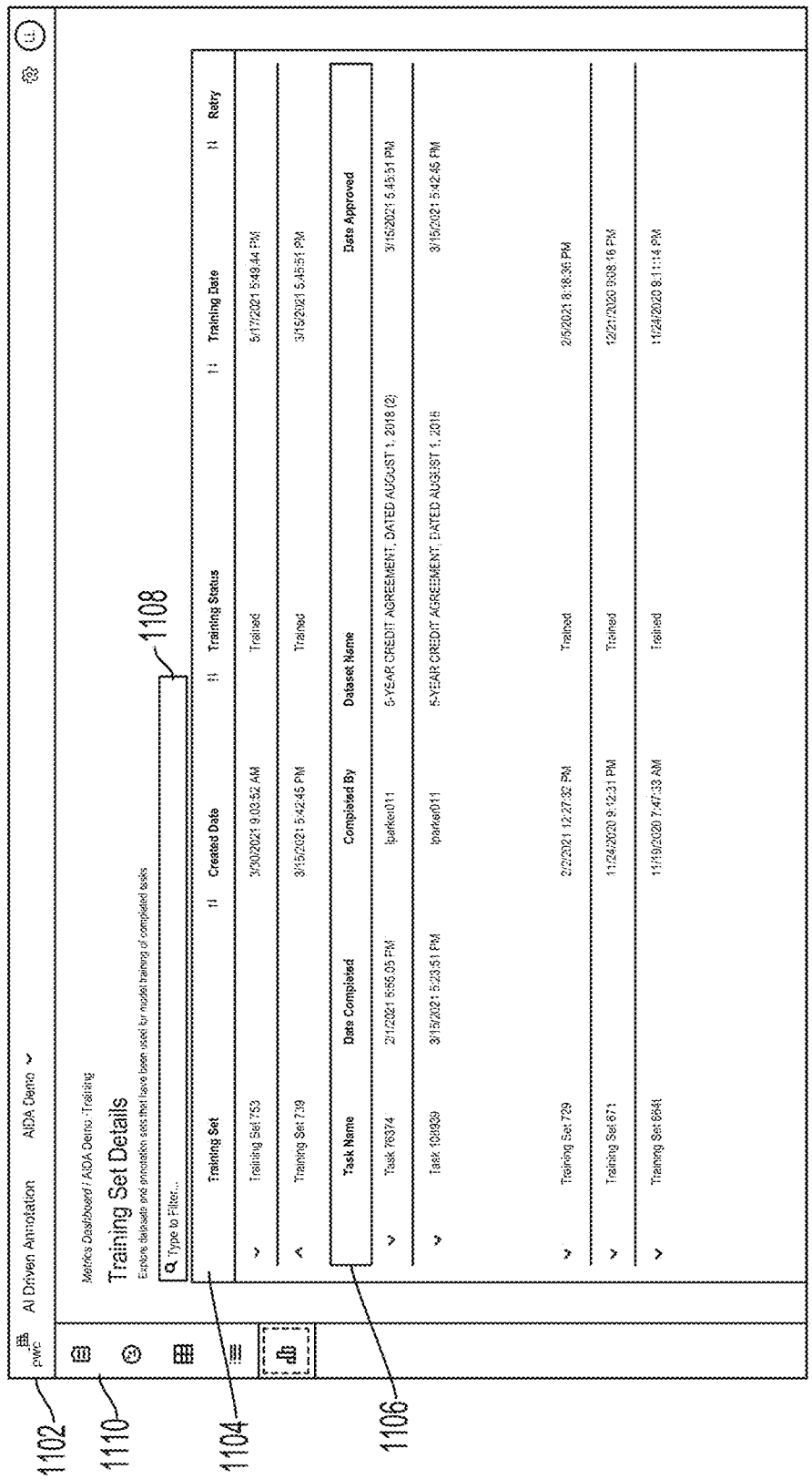
FIG. 11 provides a non-limiting example of a graphical user interface for an AI-driven document annotation and data extraction system.

FIG. 11 provides a non-limiting example of another GUI page for the disclosed AI-driven document annotation and data extraction system. The "Training Set Details" page, 1102, provides users with an overview of model training. A project owner can review the completed annotation tasks from the team and can select to approve annotated documents for model training from the previously described "Task Dashboard" page, as illustrated by drop down menu 1204 in the portion of the "Task Dashboard" page, 1202, shown in FIG. 12. Data extraction models are trained using batches of annotated documents. The batch size used for training is configurable by the project owner for each project on the "Project Details" page. The training details for all approved tasks can be reviewed on the "Model Metrics Dashboard" described below. Once the annotated document batch size for a training set is met, model training is initiated automatically. The "Training Set Details" page illustrated in FIG. 11 provides a listing of training data sets (e.g., as listed in region 1104), what documents have been approved for training and are associated with each training set/batch (e.g., as listed in expandable region 1106), what annotations from those documents were sent for model training, and model training status (e.g., trained successfully or failed) for each training set (e.g., as listed in region 1104). By accessing the "Training Set Details" page, project owners can approve tasks to meet the batch size and monitor model training. The page also provides for easy access to other GUI pages, e.g., by clicking on one of the buttons listed in region 1110.

Figure 13:
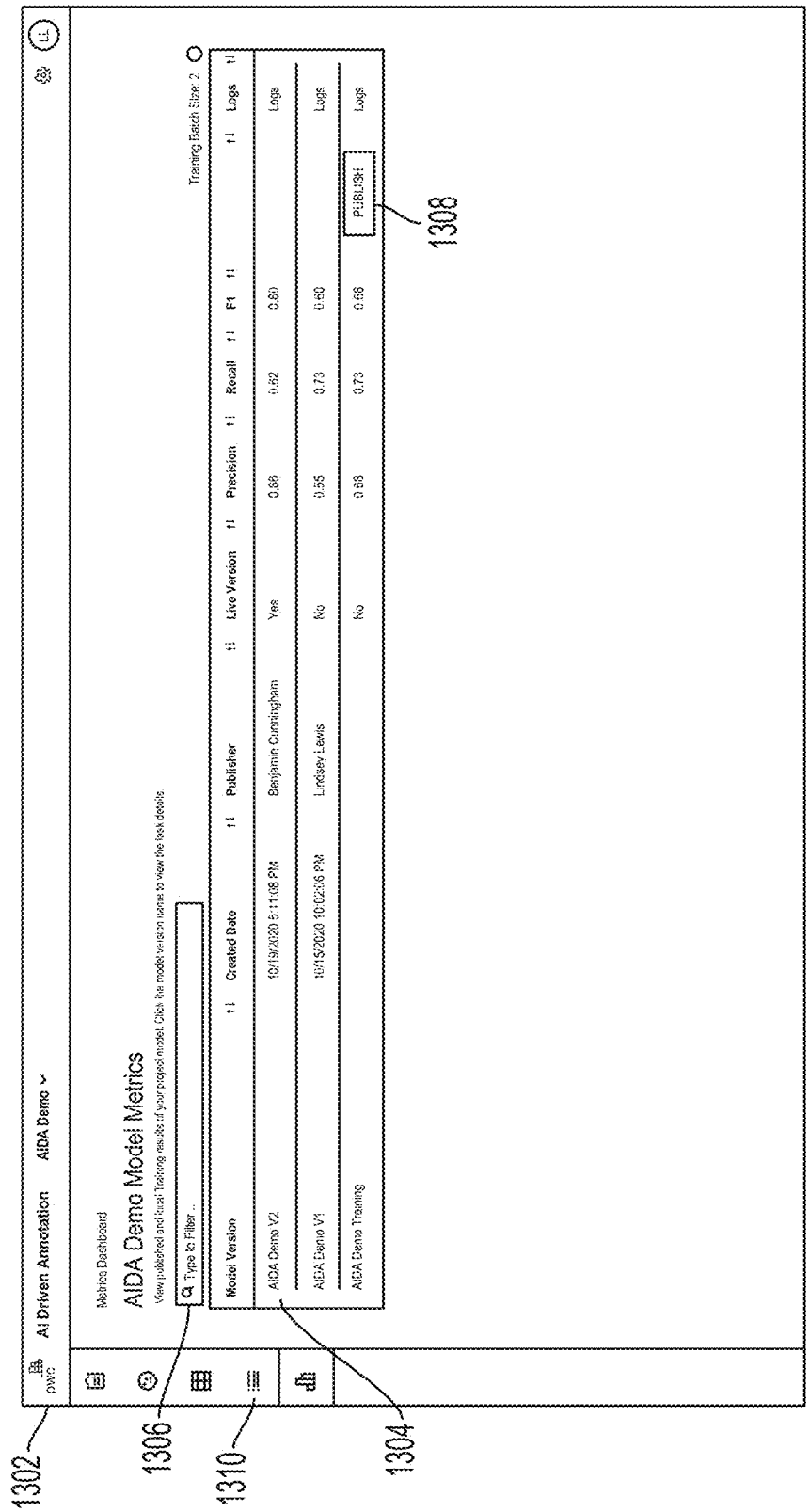
FIG. 13 provides a non-limiting example of a graphical user interface for an AI-driven document annotation and data extraction system.

FIG. 13 provides a non-limiting example of another GUI page for the disclosed AI-driven document annotation and data extraction system. The "AIDA Demo Model Metrics" page, 1302, is an example of a "Model Metrics Dashboard" that provides users with an overview of trained model performance metrics. Once model training using a training set/batch of annotated documents has been successfully completed, the model performance metric scores, e.g., Precision (the fraction of relevant instances among the retrieved instances), Recall (the fraction of relevant instances that were retrieved), and F1 (a single measurement comprised of Precision and Recall and having a value ranging from 0 to 1), will be displayed. After a project has successfully completed model training using at least one successful training set, the data extraction model is introduced to new input data and can return model predictions on documents. By accessing the "Model Metrics Dashboard", users may review model version and model performance metrics (e.g., as listed in region 1304), search for model metric associated with a specific model (e.g., using search box 1306), conduct iterative model tuning via introduction of new annotated documents, validate model prediction results, and publish a document data extraction model (or "snapshot" thereof) (e.g., using the publish button 1308) via the application programming interface (API) of the AI-based services platform. The page also provides for easy access to other GUI pages, e.g., by clicking on one of the buttons listed in region 1310.

Figure 14:
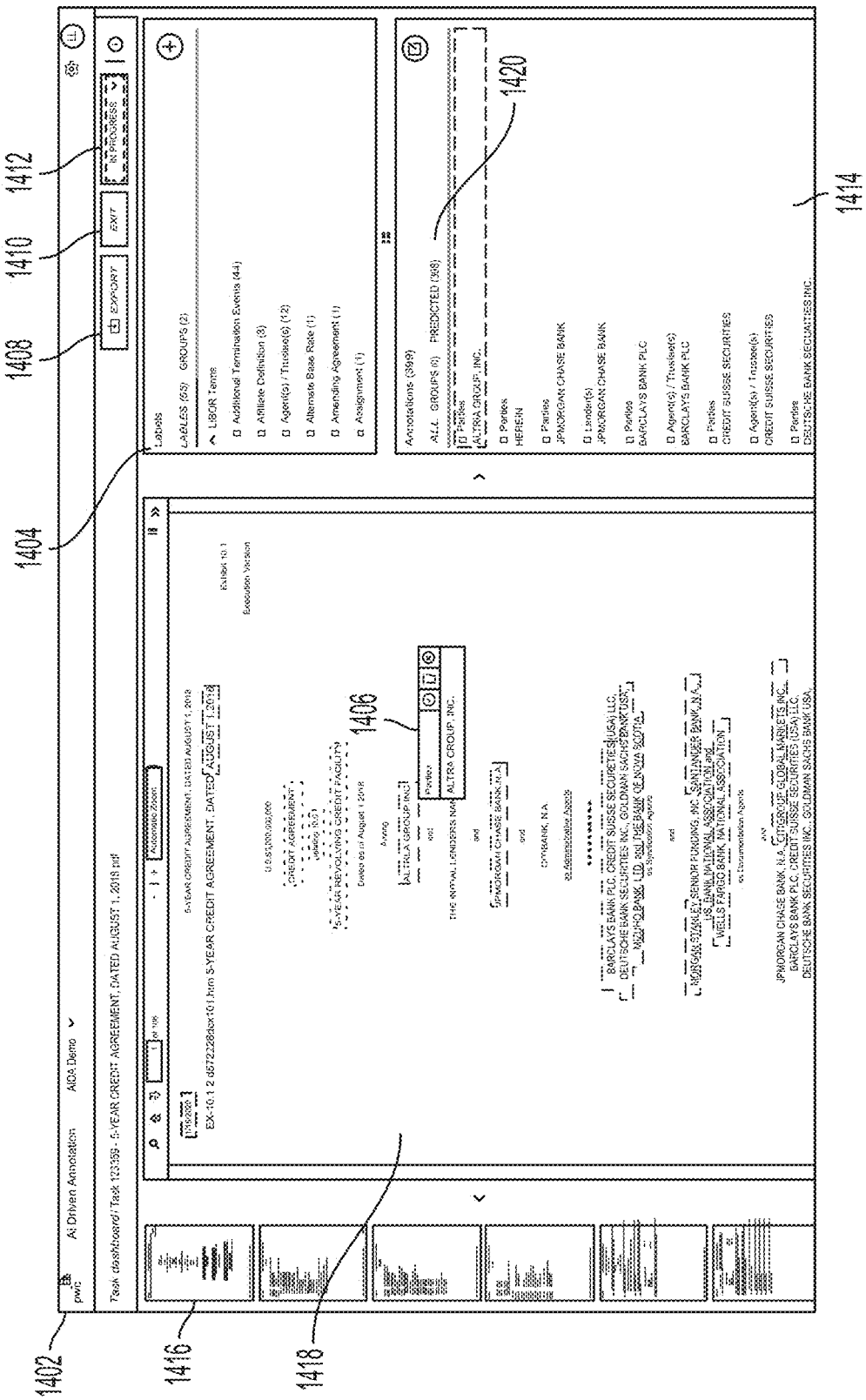
FIG. 14 provides a non-limiting example of a graphical user interface for an AI-driven document annotation and data extraction system.

FIG. 14 provides another non-limiting example of the "Annotation User Interface" page, 1402, which, in addition to providing user access to document annotation tools as described above, also allows users to verify their project's model accuracy. The document data extraction model will get more accurate at predicting terms (i.e., the document text associated with a given label or tag) with the more examples it is trained on. Annotating documents, training models, and reviewing model predictions as part of model testing and validation is a continuous process. The "Annotation User Interface" page with predictions allows the project team to determine if additional training is needed. By accessing the "Annotation User Interface" page, users can view annotated document pages in the main page display region, 1418, review and/or select labels associated with a model (e.g., as displayed in region 1404), review model predictions by clicking on the "Predicted" tab, 1420, in the Annotations panel, 1414, on the bottom right. For each prediction, the user can view the prediction (e.g., in popup window 1406) and accept the prediction if correct or reject prediction if not correct. Once the document has been completely annotated, the user can mark their document as "Complete". Project owners can again approve completed tasks (e.g., using drop down status menu 1412) for additional model training. Buttons 1408 and 1410 provide the user with annotation/prediction data export capability and annotation/prediction session exit functions, respectively. Panel 1416 displays thumbnail images of individual document pages, which allow the user to click through the document quickly. The user is also able to scroll through the document using right and left arrows displayed on each side of the current page display, 1418.

Figure 15:
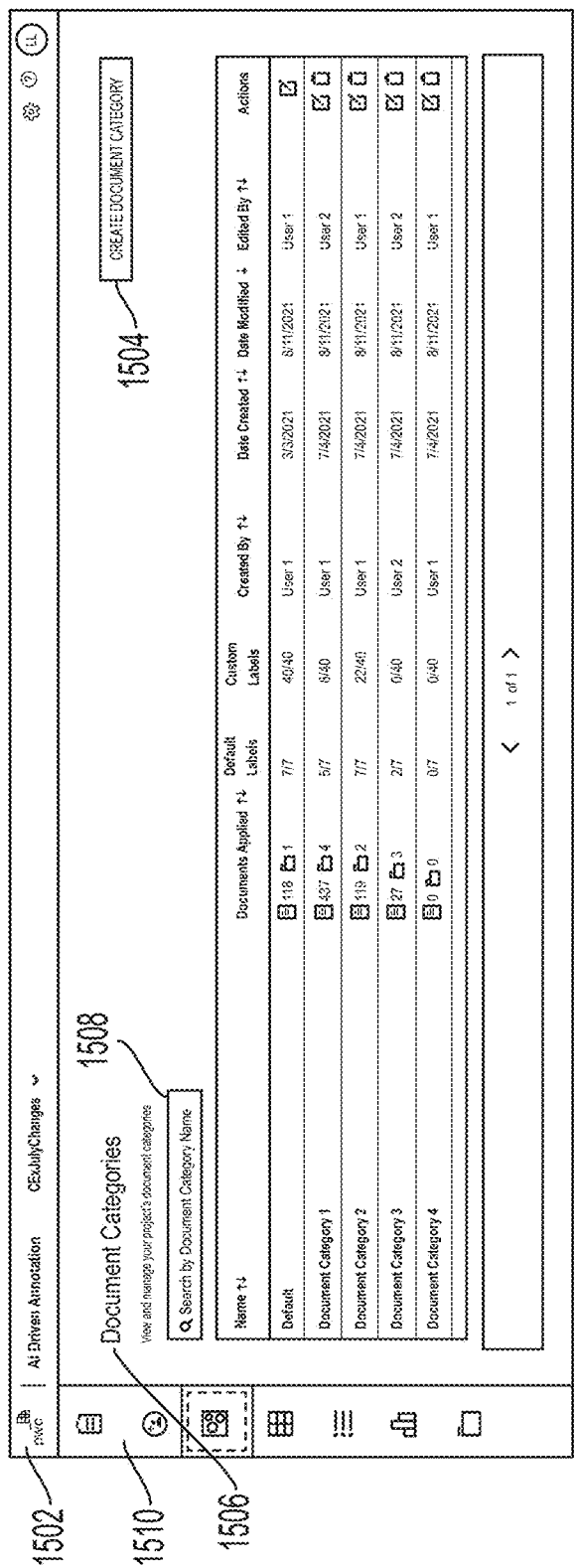
FIG. 15 provides a non-limiting example of a graphical user interface for an AI-driven document annotation and data extraction system.

FIG. 15 provides a non-limiting example of a GUI page that may be included in some instances of the disclosed AI-driven document annotation and data extraction system. The "Document Category" page, 1502, provides a document categories overview that allows the project team for an individual AIDA project the flexibility to assess multiple data models (i.e., sets of labels). Document categories can be created in instances where a given client has differentiating document types (e.g., loan documents vs. Deeds of Trust). Every project can have a "Default" document category to work in. Project owners have the ability to create additional document categories in their project. By accessing the "Document Category" page, users can create new document categories (e.g., using button 1504), view a list of document categories (e.g., as listed in region 1506), search the list of document categories associated with a given project using search box 1508, and click through to other GUI pages using the buttons or icons listed in panel 1510. For any of the GUI pages illustrated herein, panel 1510 (or its equivalent in the other examples of GUI pages provided) may include, for example, buttons or icons to select and view information about project details, the project team, document categories, datasets, tasks, model metrics, and/or model details.

Figure 16:
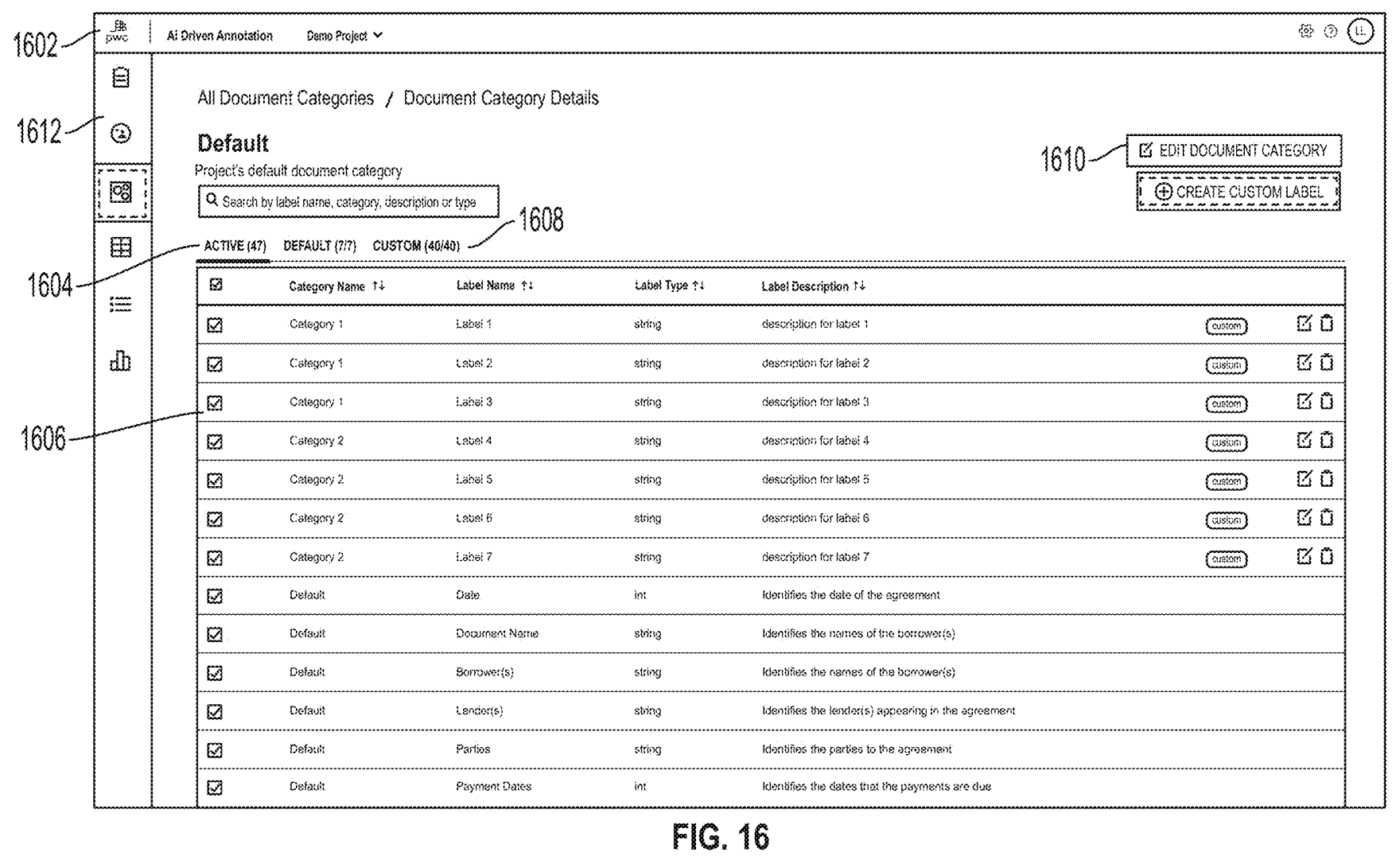

FIG. 16 provides a non-limiting example of another GUI page, 1602, that may be included in some instances of the disclosed AI-driven document annotation and data extraction system. By clicking on one of the document categories listed in region 1506 of the "Document Category" page, 1502, illustrated in FIG. 15, one can view a GUI page that provides the ability to manage labels using document categories. By accessing the GUI page illustrated in FIG. 16, the user can specify which labels to use for a project's document category. After a given document category is created, the project owner is able to define the labels/data model for each document category by selecting from a list of "active" labels (e.g., a viewed by clicking on the "active labels" tab 1604 to display a listing of active labels in region 1606) and/or by creating new custom labels (e.g., by clicking on the "create custom label" tab). Default labels are labels for which a document data extraction model has been pre-trained and which can be added to the project and used to immediately see predictions. Custom labels are any additional bespoke labels required by the client or project team for document data extraction, and may be viewed by clicking on the "custom labels" tab 1608. The list of labels associated with a document category can be edited, e.g., by clicking on button 1610. The user can click through to other GUI pages using the buttons or icons listed in panel 1612.

Figure 17:
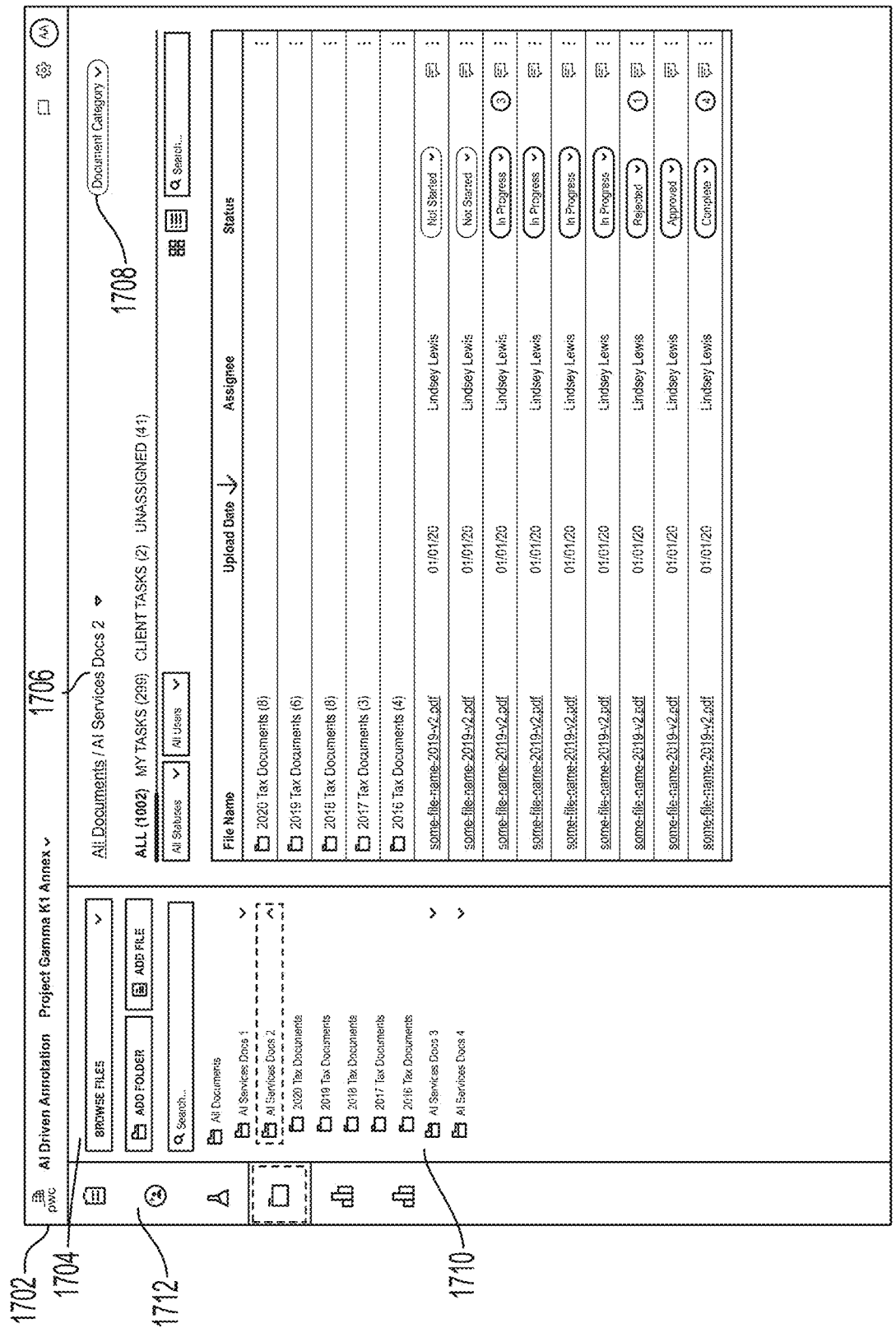
FIG. 17 provides a non-limiting example of a graphical user interface for an AI-driven document annotation and data extraction system.

FIG. 17 provides a non-limiting example of another GUI page, 1702, that may be included in some instances of the disclosed AI-driven document annotation and data extraction system. The "Folder Panel" page, 1702, allows the user to organize project documents into folders. A project owner can browse folders, create one or more folders or subfolders, and add or organize documents using the buttons or drop down menus displayed in the task dashboard, 1704. A list of folders, subfolders, and/or documents is displayed in region/panel 1706. Upon uploading of new documents, the user can pick which folder to upload the documents into. Region/panel 1710 provides a display of folders for ease of navigation. Project owners can specify which document category to assign the folder(s) or documents to, e.g., using drop down menu 1708. The designation of what document category a given document belongs to will determine what labels and model predictions the project team members (e.g., the annotators) see displayed on the Annotation UI page. The user can click through to other GUI pages using the buttons or icons listed in panel 1710.

Figure 18:
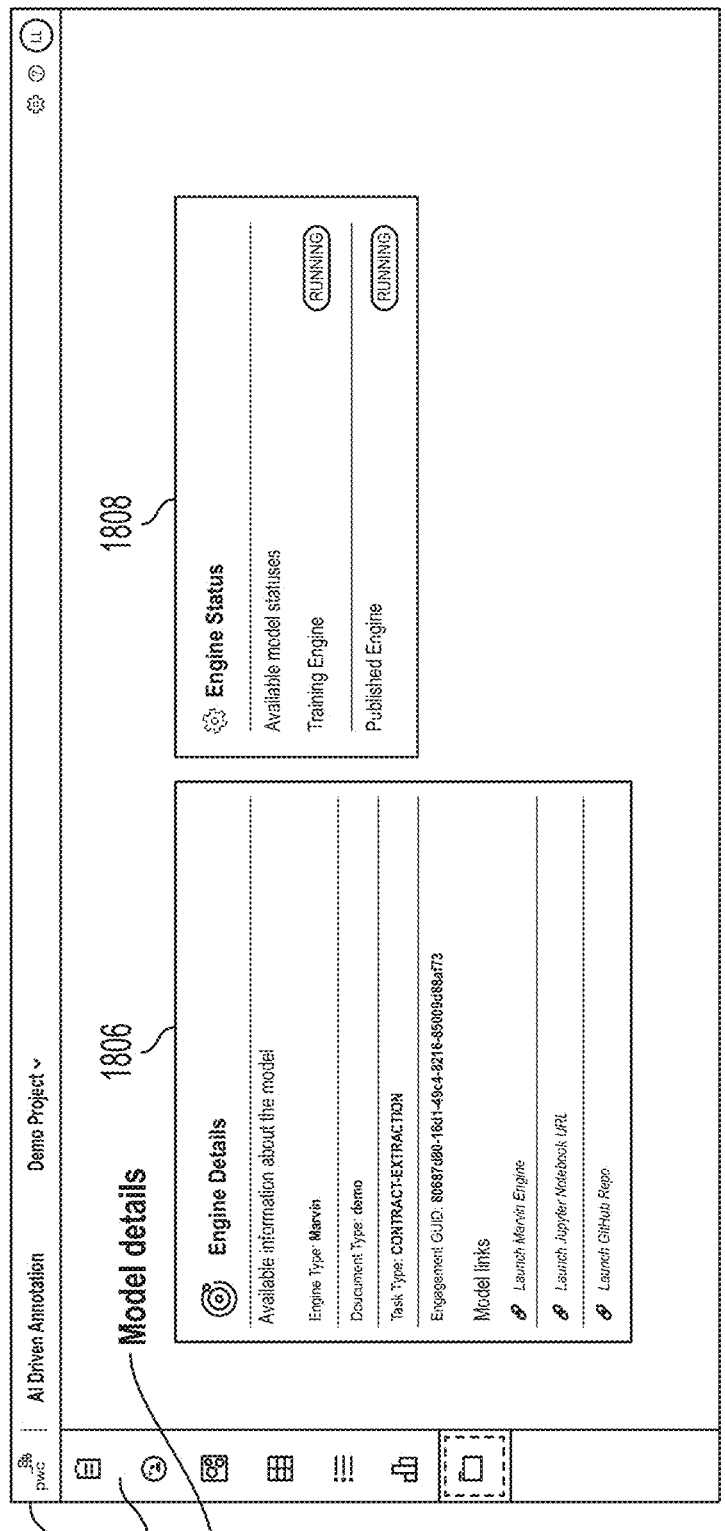
FIG. 18 provides a non-limiting example of a graphical user interface for an AI-driven document annotation and data extraction system.

FIG. 18 provides a non-limiting example of another GUI page, a "Model Details" page, 1802, that may be included in some instances of the disclosed AI-driven document annotation and data extraction system. An additional user role for project team members, "Data Scientist", may be introduced in some instances of the disclosed methods and systems. If a user has been assigned to an AIDA project as a Data Scientist, they will have access to the "Model Details" page, 1802, to better manage the document data extraction model development. The "Model Details" page, 1802, provides a display of model development infrastructure information (model details, 1804), e.g., the continuous learning model development engine details displayed in region/panel 1806, and the continuous learning model development engine status information displayed in region/panel 1808. Again, the user can click through to other GUI pages using the buttons or icons listed in panel 1810.

Figure 19:
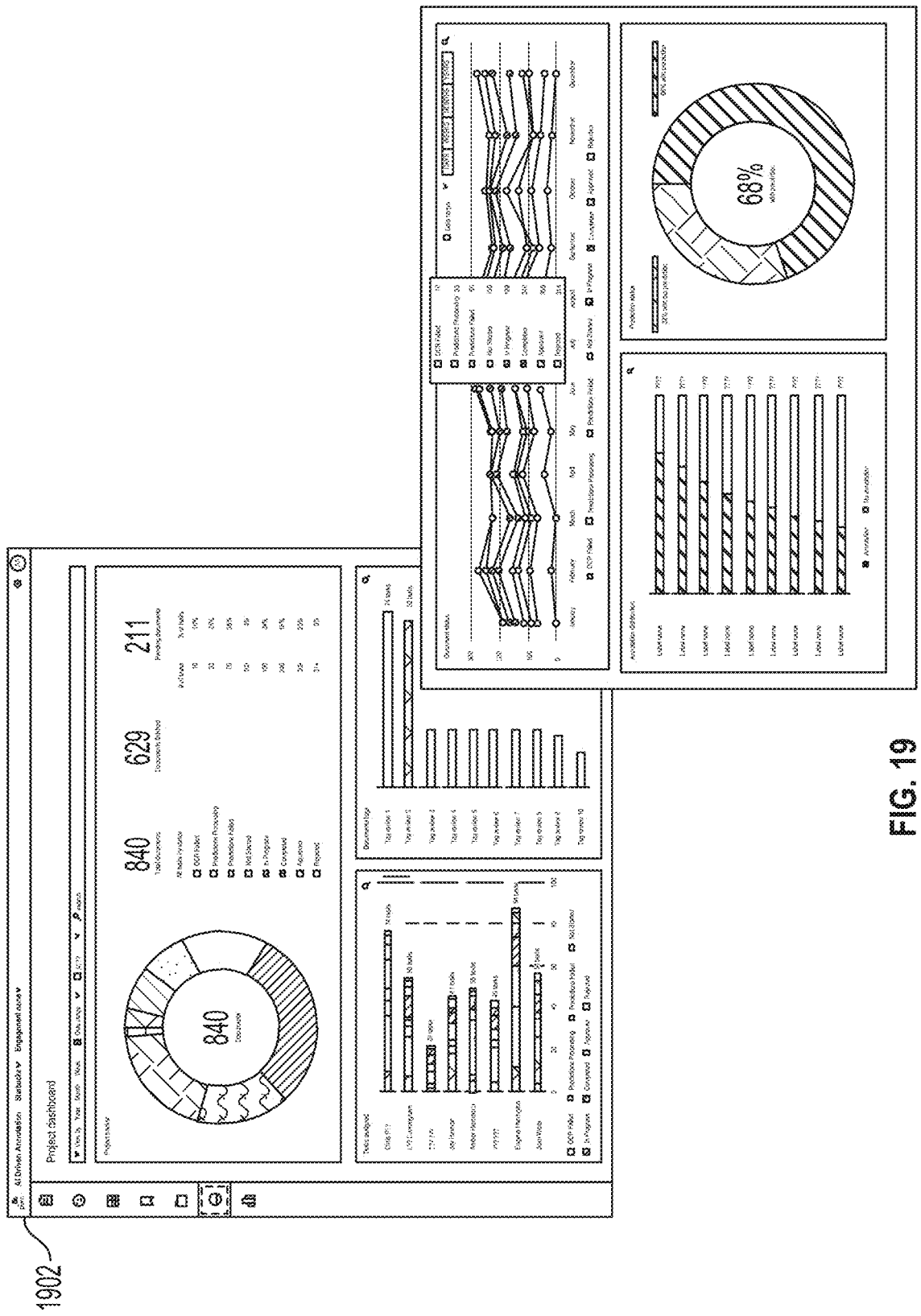
FIG. 19 provides a non-limiting example of a graphical user interface for an AI-driven document annotation and data extraction system.

FIG. 19 provides non-limiting examples of a "Project Metrics" page, 1902, that may be included in some instances of the disclosed AI-driven document annotation and data extraction system. The "Project Metrics" dashboard provides a high level overview of project metrics, e.g., the total number of documents by workflow status, the total number of documents assigned to an annotator by document annotation status, the frequency of labels used, and a listing of the top tags applied in a project.

Figure 20:
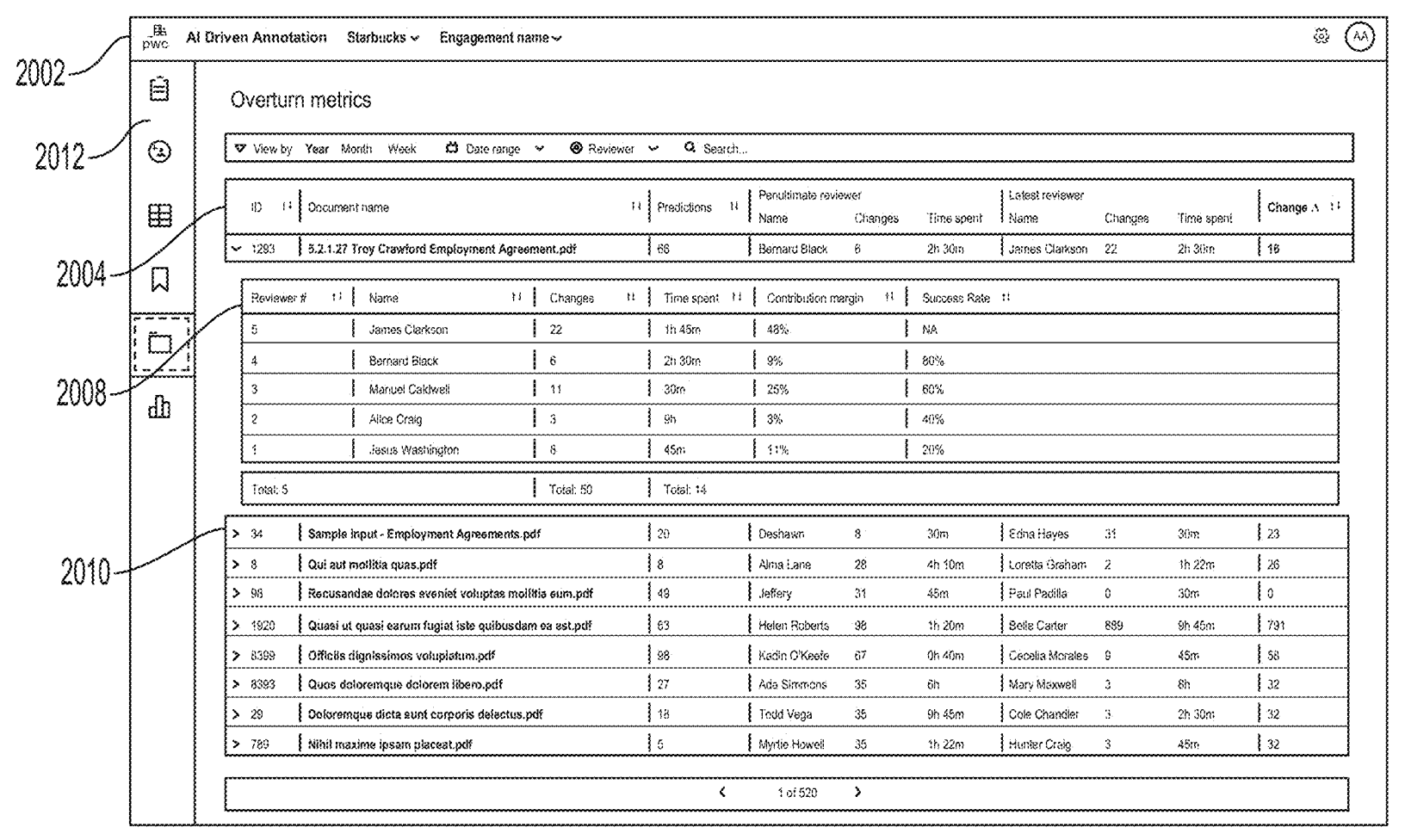

FIG. 20 provides a non-limiting example of a "Overturn Metrics" page, 2002, that may be included in some instances of the disclosed AI-driven document annotation and data extraction system. The annotation "Overturn Metrics" dashboard, 2002, provides project owners insight into the time it takes to complete a given annotation task. By accessing this GUI page, project owners will be able to, for example, view counts of annotations/predictions made for each document (e.g., as displayed in region/panel 2004) prior to review, the total number of reviewers for each document and the total count of annotation changes made for each reviewer (e.g., as displayed in region/panel 2008), and drill into a specific document and review annotation/change details (e.g., as displayed in region/panel 2010). The user can click through to other GUI pages using the buttons or icons listed in panel 2012.

Figure 21:
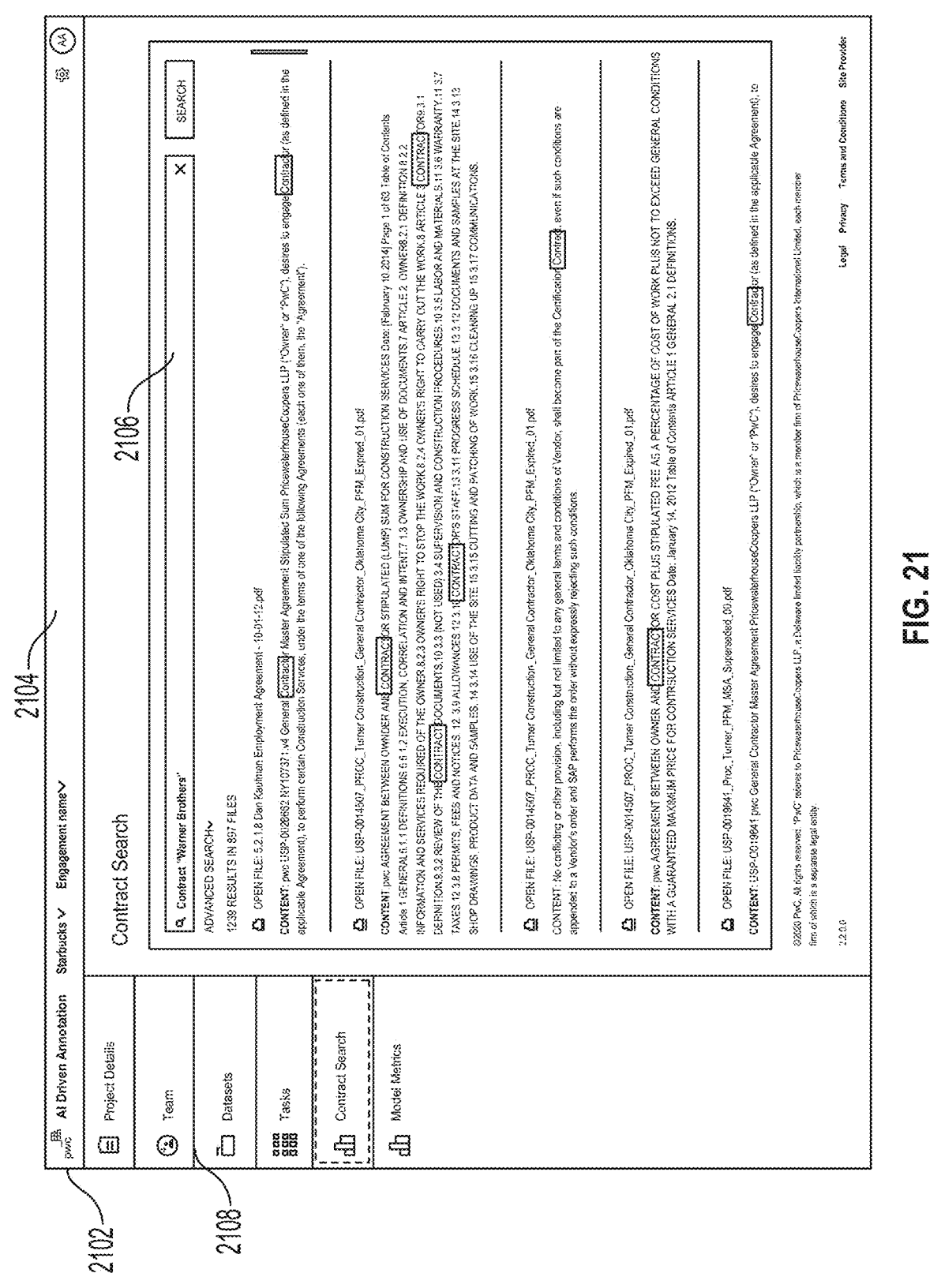

FIG. 21 provides a non-limiting example of a "Document Search" page, 2102, that may be included in some instances of the disclosed AI-driven document annotation and data extraction system. This GUI page provides user access to a search engine that allows team members to search (e.g., using search box 2106) across: content from the document, key terms/phrases, labels/entities, and other metadata (e.g., filename, upload date, etc.). Once the search is complete, the user is able to view a listing of all documents that met the search criteria (e.g., as displayed in region/panel 2104), see the search results highlighted in the listing in region/panel 2104, and access the individual documents. The user can click through to other GUI pages using the buttons or icons listed in panel 2108.

Figure 22:
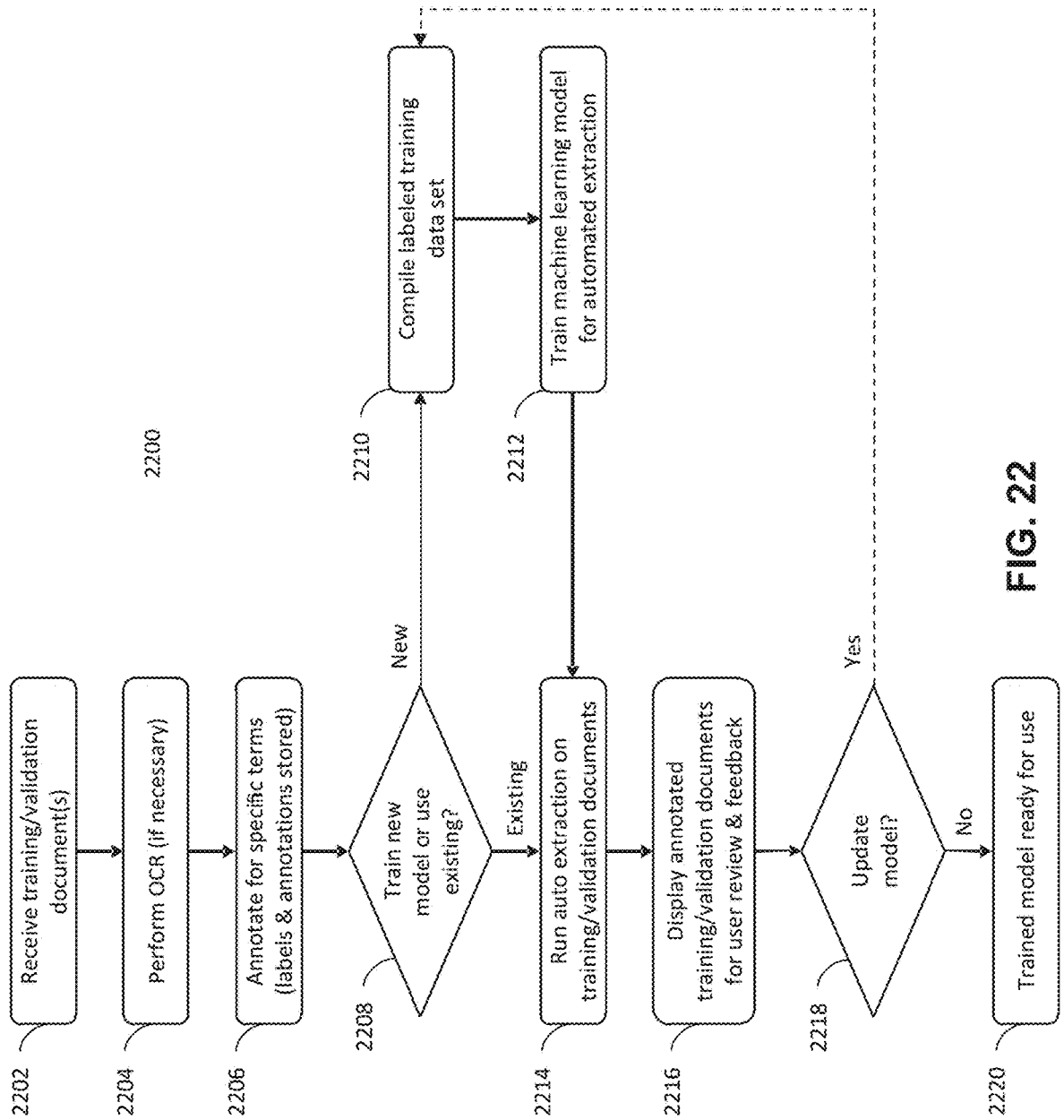
FIG. 22 provides a non-limiting example of a process flowchart for AI-driven document annotation and training of term-based machine learning models for document data extraction.

Training of Term-Based Machine Learning Data Extraction Models:

FIG. 22 provides a non-limiting example of a more detailed process flowchart for AI-driven document annotation and training of term-based machine learning models for automated electronic document data extraction. In step 2202 of process 2200, training and/or validation documents are received from (e.g., uploaded by) a user of the disclosed systems. The training/validation documents are used to provide examples of the types of documents to be processed and the types of information to be extracted therefrom. In step 2204, optical character recognition is performed if necessary. In step 2206, the user reviews and annotates at least a subset of the input training/validation documents using, e.g., the AI-driven annotation tool described above, to highlight examples of the annotations (and corresponding labels) to be extracted for the user's project, which may then be stored as a training data set.

Depending on the list of terms to be extracted, at step 2208 the user (e.g., a client or a project manager) may choose to use one or more existing, pre-trained models from a central repository, or they may choose to train one or more new term-based models. In the instance that an existing model is chosen, at least a subset of the input training/validation documents (e.g., the remaining input training/validation documents that have not been annotated) may be processed using the model at step 2214, followed by display of the annotation results for user review and feedback at step 2216. The performance of the term-based data extraction model may then be compared to a set of target performance metrics (e.g., annotation accuracy, etc.) at step 2218 to decide whether the model should be updated (e.g., further trained) or deployed for use at step 2220.

In the instance that the user decides that a new model should be trained at step 2208, or that the user decides that an existing model should be updated at step 2218, a new or expanded set of labeled training data is compiled at step 2210 (e.g., using the annotated documents and associated label and annotation data generated at step 2206, and/or using additional labeled training data), and the automated data extraction model is trained (or re-trained) at step 2212. The trained or re-trained model is then used to process remaining or additional training/validation documents at step 2214, followed by display of the annotation results for user review and feedback at step 2216, comparison of the performance metrics for the new or updated data extraction model to the set of target performance metrics at step 2218, and a decision of whether the model should be further trained or deployed for use at step 2220. The steps of updating or further training the data extraction model, e.g., steps 2218, 2210, 2212, 2214, and 2216, may be iterated any number of times until the model's performance metrics meet, or are within an acceptable range of, the target performance metrics.

In some instances, the training of a new document data extraction model may comprise the use of at least 10, 20, 30, 40, 50, 60. 70, 80, 90, 100, or more than 100 annotated training documents.

In some instances, the training of a new document data extraction model may take less than about 60 minutes, less than about 50 minutes, less than about 40 minutes, less than about 30 minutes, less than about 20 minutes, less than about 15 minutes, less than about 10 minutes, or less than about 5 minutes.

Examples of performance metrics that may be used to characterize the performance of a term-based data extraction model according to the methods disclosed herein include, but are not limited to, annotation prediction accuracy (e.g., the number of correctly identified instances of the specified annotation divided by the total number of predictions), recall, and F1.

The disclosed methods and systems may be used to annotate and/or extract document data from any of a variety of electronic document formats. Examples include, but are not limited to, Microsoft® Word format, portable document format (PDF), plain text documents, formatted text documents, rich text documents, structured text documents, comma-separated values (CSV) documents, extensible markup language (XML) documents, hypertext markup language (HTML) documents, tag image file format (TIFF), joint photographic experts group (JPEG), and the like.

The disclosed methods and systems may be implemented using any of a variety of machine learning algorithms known to those of skill in the art. Examples include, but are not limited to, supervised learning algorithms, semi-supervised learning algorithms, deep learning algorithms, or any combination thereof. In some instances, the disclosed methods and systems may be implemented using, e.g., passive-aggressive classifiers.

Supervised learning algorithms: Supervised learning algorithms are algorithms that rely on the use of a set of labeled training data to infer the relationship between a label (e.g., a type of term) and text corresponding to the label. The training data comprises a set of paired training examples, e.g., where each example comprises a block of text and a corresponding label. Examples of supervised learning architectures include, but are not limited to, artificial neural networks, convolutional neural networks, deep learning algorithms, and the like.

Neural networks generally comprise an interconnected group of nodes organized into multiple layers of nodes. For example, the neural network architecture may comprise at least an input layer, one or more hidden layers, and an output layer. The neural network may comprise any total number of layers, and any number of hidden layers, where the hidden layers function as trainable feature extractors that allow mapping of a set of input data to a preferred output value or set of output values (e.g., a prediction or classification decision). Each layer of the neural network may comprise a plurality of nodes. A node receives input that comes either directly from the input data (e.g., text data) or the output of nodes in previous layers, and performs a specific operation, e.g., a summation operation. In some cases, a connection from an input to a node is associated with a weight (or weighting factor). In some cases, the node may, for example, sum up the products of all pairs of inputs, Xi, and their associated weights, Wi, from a previous layer. In some cases, the weighted sum is offset with a bias, b. In some cases, the output of a node may be gated using a threshold or activation function, f, which may be a linear or non-linear function. The activation function may be, for example, a rectified linear unit (ReLU) activation function or other function such as a saturating hyperbolic tangent, identity, binary step, logistic, arcTan, softsign, parameteric rectified linear unit, exponential linear unit, softPlus, bent identity, softExponential, Sinusoid, Sine, Gaussian, or sigmoid function, or any combination thereof.

The weighting factors, bias values, and threshold values, or other computational parameters of the neural network, can be "taught" or "learned" in a training phase using one or more sets of training data. For example, the parameters may be trained using the input data from a training data set and a gradient descent or backward propagation method so that the output value(s) (e.g., an annotation label prediction, or a text block predicted to be associated with a given annotation label) that the neural network generates are consistent with the examples included in the training data set. In some instances, the adjustable parameters of the model may be obtained using, e.g., a back propagation neural network training process that may or may not be performed using the same computing hardware or infrastructure as that used for processing electronic documents in an automated document data extraction pipeline.

Semi-supervised learning algorithms: Semi-supervised learning algorithms are algorithms that make use of both labeled and unlabeled classification data for training (typically using a relatively small amount of labeled data with a larger amount of unlabeled data).

Deep learning algorithms: Deep learning algorithms are large neural networks comprising many "hidden" layers of coupled nodes that may be trained and used to map input data to output prediction or classification decisions.

Passive-aggressive classifiers: Passive-aggressive classifiers are a family of machine learning algorithms used for large-scale, continuous online learning, e.g., where instances of input training data are received sequentially, and the machine learning model is updated as the new training data is received (i.e., as opposed to a model trained using a "batch learning" mode, where an entire training dataset is used to train the model in each of one or more training sessions). After each instance of new training data is received, the model outputs a prediction, e.g., a classification of a block of text as belonging to a specified label or category. Following the prediction, the model is provided with feedback indicating the correct prediction, which may then be used to modify the prediction mechanism and improve the prediction accuracy of the model in subsequent rounds. These models are useful in situations where, for example, there is a large amount of data and it is computationally infeasible to train the model on the entire data set due to the sheer size of the training data set, or where new training data is received on an intermittent basis, and may be applied to applications ranging from regression to sequence prediction (see, for example, Crammer, et al. (2006), "Online Passive-Aggressive Algorithms", J. Machine Learning 7:551-585).

Figure 23:
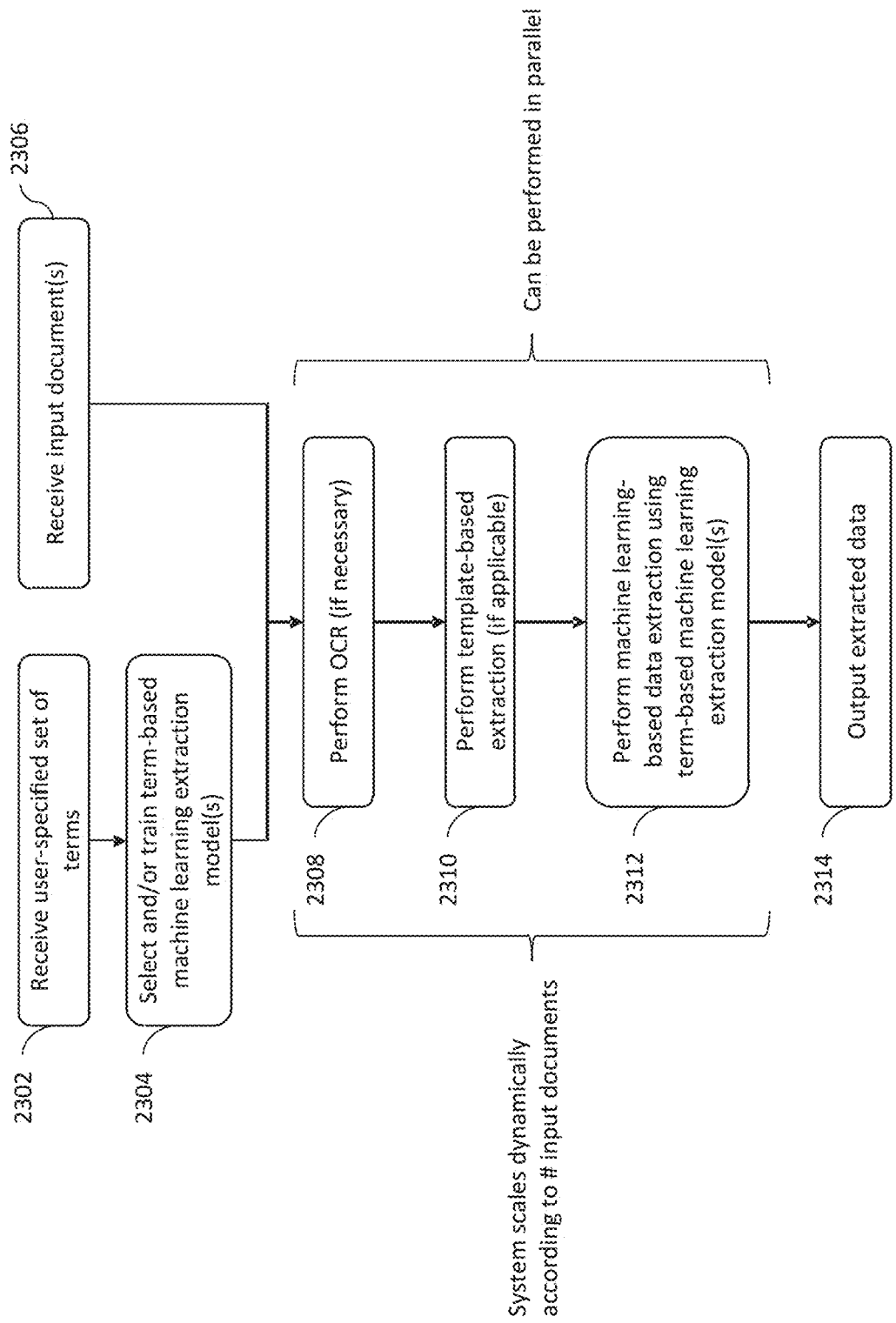
FIG. 23 provides a non-limiting example of a process flowchart for automated document data extraction using a data extraction pipeline comprising a plurality of term-based machine learning models.

Automated Document Data Extraction Pipelines:

FIG. 23 provides a non-limiting example of a process flowchart for automated document data extraction using a data extraction pipeline comprising a plurality of term-based machine learning models. At step 2302, a set of user-specified terms (e.g., types of information to be extracted) are received from a user and used to configure the pipeline. At step 2304, the user or a user representative (e.g., a program manager or customer support manager) may review a central repository (e.g., a model zoo) of pre-trained term-based models and select one or more models for use based on the user-specified list of extraction terms. In some instances, the user or user representative may choose to further train (or "tune") one or more of the pre-trained term-based models from the central repository using a training data set comprising a set of user-annotated documents to, e.g., improve the accuracy of data extraction from the specific document layout format(s) of interest to the user. In some instances, the user or user representative may choose to train one or more new term-based models using a training data set comprising a set of user-annotated documents. Following the selection and/or training of term-based extraction models performed at step 2304, the data extraction pipeline may comprise any combination of one or more pre-trained term-based models, one or more further trained term-based models, and/or one or more newly-trained term-based extraction models.

In some instances, the configured data extraction pipelines of the present disclosure may comprise at least 1, 2, 3, 4, 5, 6, 7, 8, 9, 10, 15, 20, 25, 30, 35, 40, 45, 50, or more than 50 term-based machine learning document data extraction models (or any number of models within this range).

In some instances, the number of models used in the configured data extraction pipeline may vary dynamically over time, e.g., as the user adjusts the list of terms for which data is extracted, or as new or re-trained term-based machine learning models are added to the central repository of pre-trained models. Furthermore, the term-based models deployed as part of the document data extraction pipeline, and the computing platform infrastructure on which they are deployed, are configured to support continuous machine learning, i.e., the models may be continuously updated (e.g., further trained or "tuned") as new training data is received from a given user or from a plurality of users.

Once the document data extraction pipeline has been configured, a set of input documents are provided by the user as indicated at step 2306 in FIG. 23. As indicated at steps 2308 and 2310, in some instances the document data extraction pipeline may include optical character recognition capability (e.g., using the ABBYY FineReader Engine, or similar software modules) and/or template-based extraction capabilities (e.g., using the ABBYY Flexicapture Engine, or similar software modules). The input documents are additionally processed, either serially or in parallel, by the one or more term-based machine learning data extraction models, as indicated at step 2312, with the extracted data stored in a dynamic data model that provides users with the flexibility to choose how to structure and display the extracted data. The extracted data, or selected subsets thereof, may then be output at step 2314 using any of a variety of user-selected formats such as Excel, CSV, or JSON.

An important aspect of the disclosed document data extraction pipelines is their ability to perform parallel processing in order to boost overall document processing throughput. In some instances, optical character recognition, template-based extraction, and/or machine learning-based data extraction may be performed in parallel for all or a portion of the input documents.

Another important aspect of the disclosed document data extraction pipelines is the ability of the computing platform infrastructure on which they are deployed to dynamically scale processing capability in order to accommodate a wide range of input in terms of the number of documents input for processing while minimizing the overall processing time. In some instances, for example, the user may input minimum and maximum sizes for the batch of documents to be processed and the computing platform infrastructure automatically scales accordingly.

In some instances, a set (or batch) of input documents for a given project may be submitted simultaneously for processing. In some instances, the input documents for a given project may be submitted in smaller sets (e.g., subsets or sub-batches) and/or continuously. In some instances, the number of input documents for a given project may range from about 10 to about 100,000. In some instances, the number of input documents for a given project may be at least 10, at least 25, at least at least 75, at least 100, at least 200, at least 300, at least 400, at least 500, at least 600, at least 700, at least 800, at least 900, at least 1000, at least 2,500, at least 5,000, at least 7,500, at least at least 20,000, at least 30,000, at least 40,000, at least 50,000, at least 60,000, at least at least 80,000, at least 90,000, or at least 100,000. In some instances, the number of input documents for a given project may be any number within the range of numbers described in this paragraph.

The combination of parallel processing capability and dynamic scaling of the distributed computing platform infrastructure according to the number of documents to be processed provides for automated, efficient, and high-throughput document data extraction processing by the disclosed data extraction pipelines. In some instances, the average processing time for automated document data extraction (including optical character recognition) using the disclosed methods and data extraction pipelines may be less than 10 minutes per document, less than 9 minutes per document, less than 8 minutes per document, less than 7 minutes per document, less than 6 minutes per document, less than 5 minutes per document, less than 4 minutes per document, less than 3 minutes per document, less than 2 minutes per document, or less than 1 minutes per document.

Figure 24:
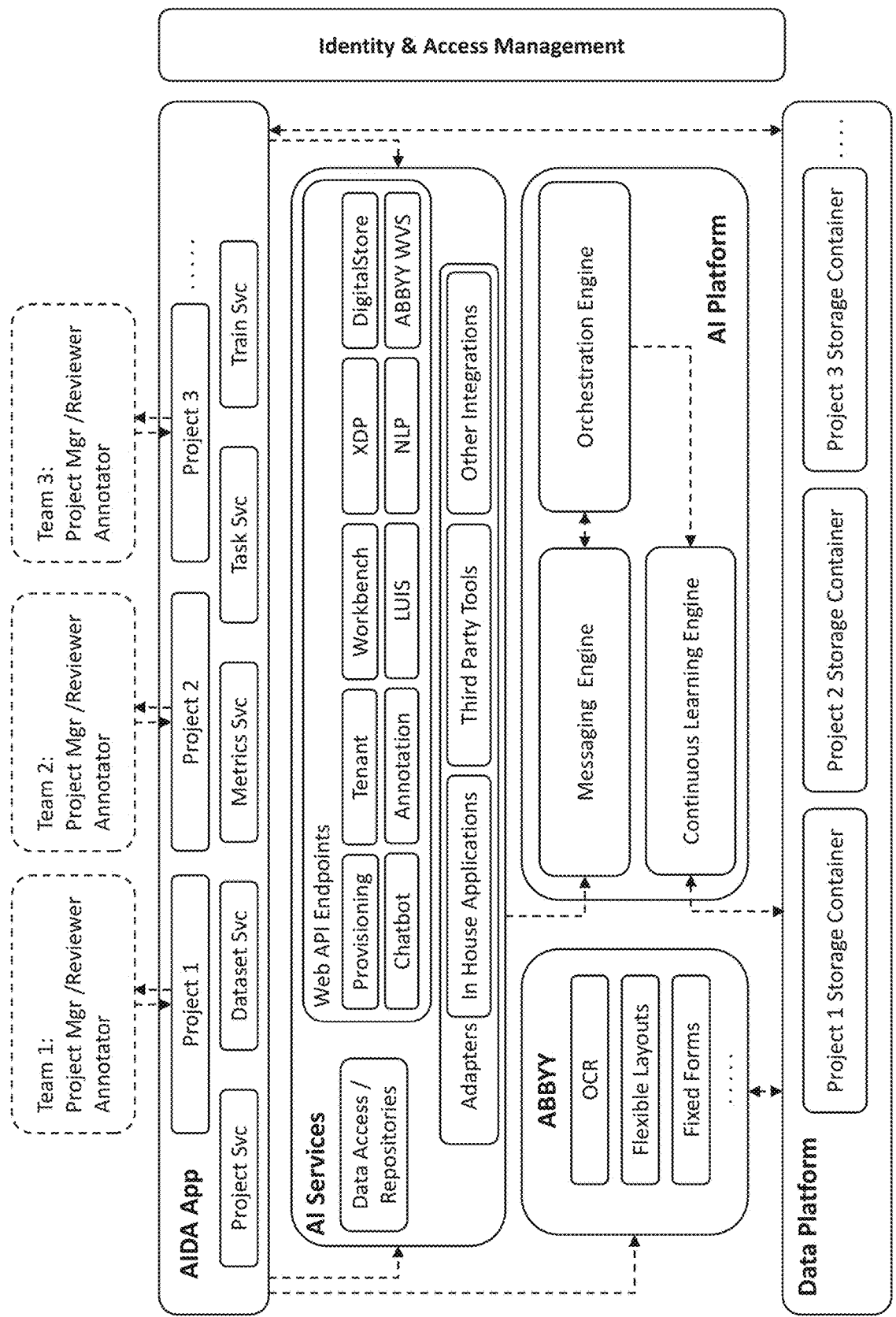
FIG. 24 provides a non-limiting schematic illustration of an AI services platform that provides AI-driven document annotation, term-based machine learning data extraction model training, and deployment of trained term-based machine learning models as part of a document data extraction pipeline.

Computing Platform Infrastructure:

As noted above, in some instances, the disclosed automated document data extraction methods and data extraction pipelines may be deployed as part of an artificial intelligence (AI)-based enterprise services platform. FIG. 24 provides a non-limiting schematic illustration of an AI services platform that provides AI-driven document annotation, term-based machine learning data extraction model training, and deployment of trained term-based machine learning models as part of a document data extraction pipeline. As illustrated in FIG. 24, the enterprise services platform may comprise a plurality of components or layers, e.g., (i) an AI services platform, (ii) an AI-driven annotation (AIDA) application running on the AI services platform, (iii) additional software modules (e.g., ABBYY optical character recognition, flexible document layout extraction tools, template-based document extraction tools, etc.), (iv) an AI computing platform that supports the AI services, (v) a data platform, and (vi) an identity and access management layer.

With respect to AI-driven document annotation, the training of term-based machine learning data extraction models, and their deployment as part of an automated electronic document data extraction pipeline, a plurality of users or project teams (e.g., team 1, team 2, team 3, etc.) may access the system via the AIDA application, which provides a graphical user interface for document annotation and model training as described above. Each team (as represented by, e.g., a project manager, document annotator, and/or document reviewer) is able to access their document data extraction project (e.g., project 1, project 2, project 3, etc.) directly via the AIDA user interface. In addition to providing the user interface, the AIDA application may support a variety of user services, e.g., project services, data set services, model training services, model performance metrics services, and task management services. The AIDA application also interfaces with the AI services platform, ABBYY (or similar) software modules for performing optical character recognition, etc., and the data platform.

As illustrated in FIG. 24, the AI services platform supports a variety of system functions, e.g., access to data storage and a central repository of trained machine learning-based document data extraction models, web-based application programmer interface (API) endpoints for AI platform services (e.g., provisioning, tenant, workbench, chatbot, annotation, natural language processing (NPL) tools, and the ABBYY web services API for Flexicapture), and adapters (e.g., for in-house applications, other third-party tools, or other integrated services). The AI services platform also interfaces with the AI computing platform (or simply, the AI platform).

As illustrated in FIG. 24, the AI platform comprises three main components: (i) a messaging engine, (ii) an orchestration engine, and (iii) a continuous learning engine. The messaging engine translates messages received from the AI services platform into the formal messaging protocol used by the AI platform. The orchestration engine arranges and coordinates automated tasks, e.g., machine learning-based document data extraction, to produce a consolidated process or workflow that maximizes process efficiency. The continuous learning engine provides the computing power that underlies document data extraction process by the one or more term-based machine learning models. The AI platform also interfaces directly with the data platform.

As illustrated in FIG. 24, additional software modules (e.g., ABBYY optical character recognition, flexible document layout extraction tools, template-based document extraction tools, etc.) may interface with the AIDA application and also with the data platform to provide optical character recognition and template-based document data extraction capabilities that may be performed in parallel with the machine learning-based data extraction process.

As illustrated in FIG. 24, the data platform provides containerized storage of project data for a plurality of projects (e.g., project 1, project 2, project 3, etc.). The identity and access management layer overlays the AI-driven annotation (AIDA) application, the AI services platform, any additional software modules, the AI computing platform, and the data platform to manage user access and ensure data security for the system.

Figure 25:
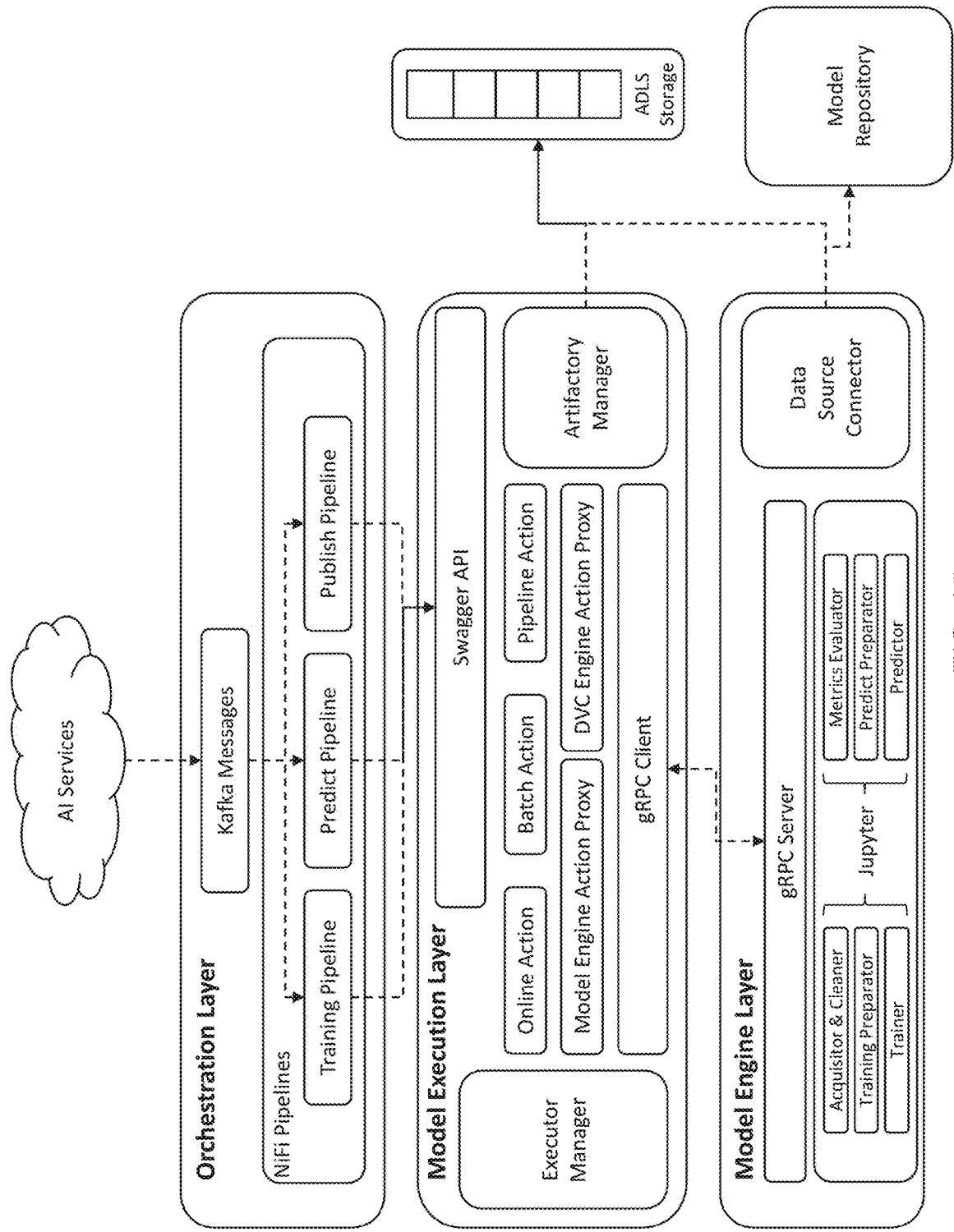
FIG. 25 provides a more detailed, non-limiting schematic illustration of the cloud-based distributed computing infrastructure that supports the AI platform illustrated in FIG. 24.

FIG. 25 provides a more detailed, non-limiting schematic illustration of the cloud-based distributed computing infrastructure that supports the AI platform illustrated in FIG. 24. Messages received from the AI services platform (e.g., Apache Kafka messages) are parsed by the orchestration layer into several data flow streams (e.g., Apache NiFi training, prediction, and publishing data pipelines). These, in turn, are interfaced with the model execution layer via a Swagger API.

As illustrated in FIG. 25, the model execution layer comprises a variety of functional components, e.g., an Executor manager that manages the execution of programs and workflows (such as online actions, batch actions, data extraction pipeline actions, model engine action proxies, and data version contro (DVC) engine action proxies) in the shared computing resource environment, and an Artifactory manager that manages the transfer of data (e.g., raw document data, training data, prediction data, and models) to a data storage repository (e.g., Microsoft® Windows Azure Data Lake Storage (ADLS)) and/or a central model repository (e.g., a GitHub repository). In some instances, the model execution layer is configured as a gRPC (remote procedure call) client and communicates with the model engine layer, which is configured as a gRPC server.

As illustrated in FIG. 25, the model engine layer comprises additional functionality for preparing data and performing term-based machine learning model-based document data extraction that may be packaged in the form of, e.g., Jupyter notebooks, and that include, e.g., an acquisitor and cleaner function, a training preparatory function, a trainer function, a metrics evaluator function, a predict preparatory function, and a predictor function. The functions performed by these Jupyter notebooks will be described in more detail below. The model engine layer may also comprise a data source connector that manages the transfer of data (e.g., raw document data, training data, prediction data, and models) to a data storage repository (e.g., Microsoft® Windows Azure Data Lake Storage (ADLS)) and/or a central model repository (e.g., a GitHub repository).

Continuous Machine Learning and Deployment of Document Extraction Pipelines:

The AI platform architecture illustrated in FIG. 25 was designed with the objective of supporting continuous machine learning. The design goals included: (i) providing language agnostic capabilities (the platform supports R, Python, SparkR, PySpark, Hive, and Scala algorithms), (ii) supporting parallel processing at many different levels (e.g., at the graphical processing unit (GPU), multi-core, and multi-node levels), (iii) deployment of machine learning models that are configured to handle concurrent traffic and provide output predictions in near real-time, and (iv) implementation of data extraction pipelines in a containerized format that allows portability.

Examples of the architectural features of the platform illustrated in FIG. 25 that support continuous machine learning include: (i) interoperability (the use of gRPC connections between the model execution layer and the Jupyter notebook code embedded in the model engine layer provides flexibility for model deployment and loading artifacts), (ii) usability (the platform includes default parameters and a Generic REST API to manage the requests and execution of different actions (e.g., train, predict, and feedback)), (iii) manageability (the platform includes an Akka/Actor feature to control the entire system (locally or remotely) that helps to manage, e.g., Azure Kubernetes Service (AKS) clusters (Akka helps for distributed installations)), (iv) scalability (the Akka/Actor model architecture is used to increase parallelism and distribution throughout the system, and facilitates containerization as a deployment solution), (v) modifiability (encapsulation through the use of the actor model and base classes; minimum responsibility for each actor and supports abstraction), (vi) maintainability (Scala/Akka is used as the implementation language, and continuous delivery and dockerization is provided using a CI/CD approach).

Figure 26:
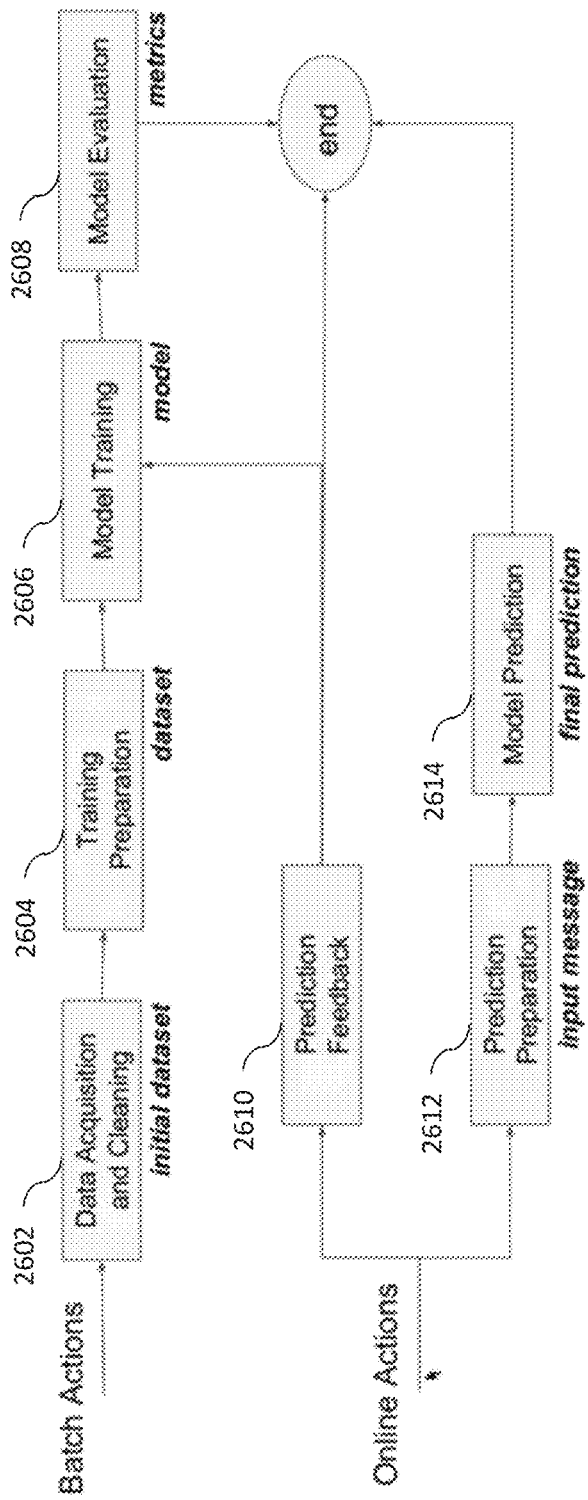
FIG. 26 provides a non-limiting schematic illustration of a composable and extensible machine learning pipeline architecture that separates "batch" actions from "online" actions and provides for continuous model learning through a feedback mechanism.

Continuous machine learning allows term-based models to be continuously and adaptively trained. The AI platform illustrated in FIG. 25 supports two different model training modes as illustrated in FIG. 26: batch mode (used, for example, to train or re-train a model from scratch), and an online mode (used, for example, to continuously update the training of a model). In the batch mode, the process steps may include, for example, data acquisition and cleaning (e.g., of an initial set of documents) at step 2602, training preparation (e.g., annotation of the training documents to create a labeled training data set) at step 2604, model training (e.g., training a term-based extraction model using the labeled training data) at step 2606, and model evaluation (e.g., evaluating model performance metrics) at step 2608. In the online mode, the process steps may include, for example, prediction feedback (on the prediction results obtained by an existing trained model) at step 2610, re-training of the model (based on the prediction feedback) at step 2606, model evaluation (to re-evaluate the model performance metrics) at step 2608, prediction preparation (e.g., inputting a new set of input documents, and a request for data extraction, once the model performance metrics for the re-trained model have reached an acceptable level of performance) at step 2612, and model prediction (e.g., extracting document data from the input documents using the re-trained model) at step 2614. The discrete and modular design of the continuous machine learning platform leads to composible and extensible machine learning pipeline architectures.

A non-limiting example of a batch mode training process may include initial training of a model using Training Set 1 (e.g., 10 annotated documents input and processed), further training (or tuning) of the model using an expanded training data set, Training Set 2 (e.g., 20 new annotated documents added to the training data set; 30 annotated document processed), and a third round of training using another expanded training data set, Training Set 3 (e.g., 30 new annotated documents added to the training data set; 60 annotated documents processed).

A non-limiting example of an online continuous training process may include further training to update an existing model using Training Set 1 (e.g., 10 annotated documents input and processed), further training of the model using additional training data, Training Set 2 (e.g., 20 new annotated documents input and processed), and a third round of further training using additional training data, Training Set 3 (e.g., 30 new annotated documents input and processed).

Figure 27:
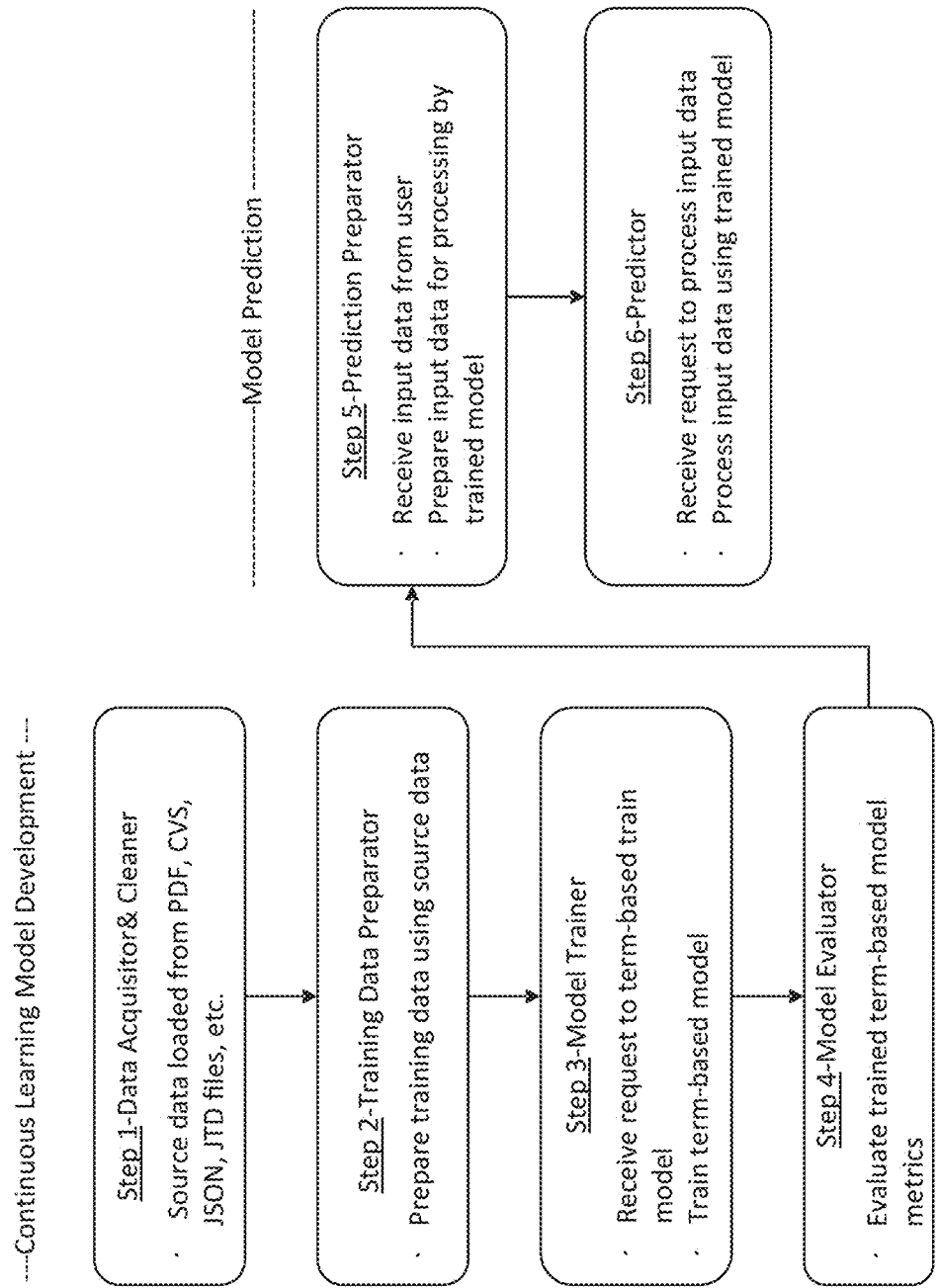
FIG. 27 provides a non-limiting schematic illustration of a modular continuous machine learning/model development platform.

FIG. 27 provides a non-limiting schematic illustration of the continuous machine learning functionality supported by the model engine layer of the AI platform illustrated in FIG. 25 for preparing data and performing term-based machine learning model-based document data extraction. In some instances, this functionality may be packaged in the form of, e.g., Jupyter notebooks, and may include, e.g., an acquisitor and cleaner function as step 1, a training preparatory function as step 2, a trainer function as step 3, a model metrics evaluator function at step 4, a predict preparatory function at step 5, and a predictor function at step 6. As part of document data extraction model development, source data (e.g., electronic documents) may be loaded at step 1 in any of a variety of file formats including, but not limited to, portable document format (PDF) files, comma separated values (CSV) files, JSON, and JTD files. The input document data is then prepared for use in model training at step 2. Model training is performed at step 3 and model performance metrics are evaluated at step 4. Once training is completed, the trained model is stored, e.g., in Windows Azure Data Lake Storage (ADLS). A decision is then made as to whether or not to publish the model. As part of model deployment and use, input date (e.g., electronic documents) is received from a user at step 5 and prepared for processing by the trained model. The document type and model version number are sent to the run predictor (trained model). Finally, the input documents are processed by the trained model at step 6 and model predictions (i.e., the data to be extracted) is output. Implementation of the individual process steps for continuous machine learning in the form of Jupyter notebooks allows one to build language-specific models and to execute each of the different steps independently (e.g., as a microservice) for ease of document processing pipeline configuration and automation. For example, in the case that one was processing 100,000 input documents (which would take hours using a conventional document extraction process), one may configure multiple parallel document processing pipelines, each running step 1, 2, 3, . . . , in parallel, for much higher throughput. In some instances, a configured document data extraction pipeline may be exported as a Docker container image (i.e., a standalone, executable package of software that includes everything needed to run the document data extraction pipeline: code, runtime, system tools, system libraries and settings).

Figure 28:
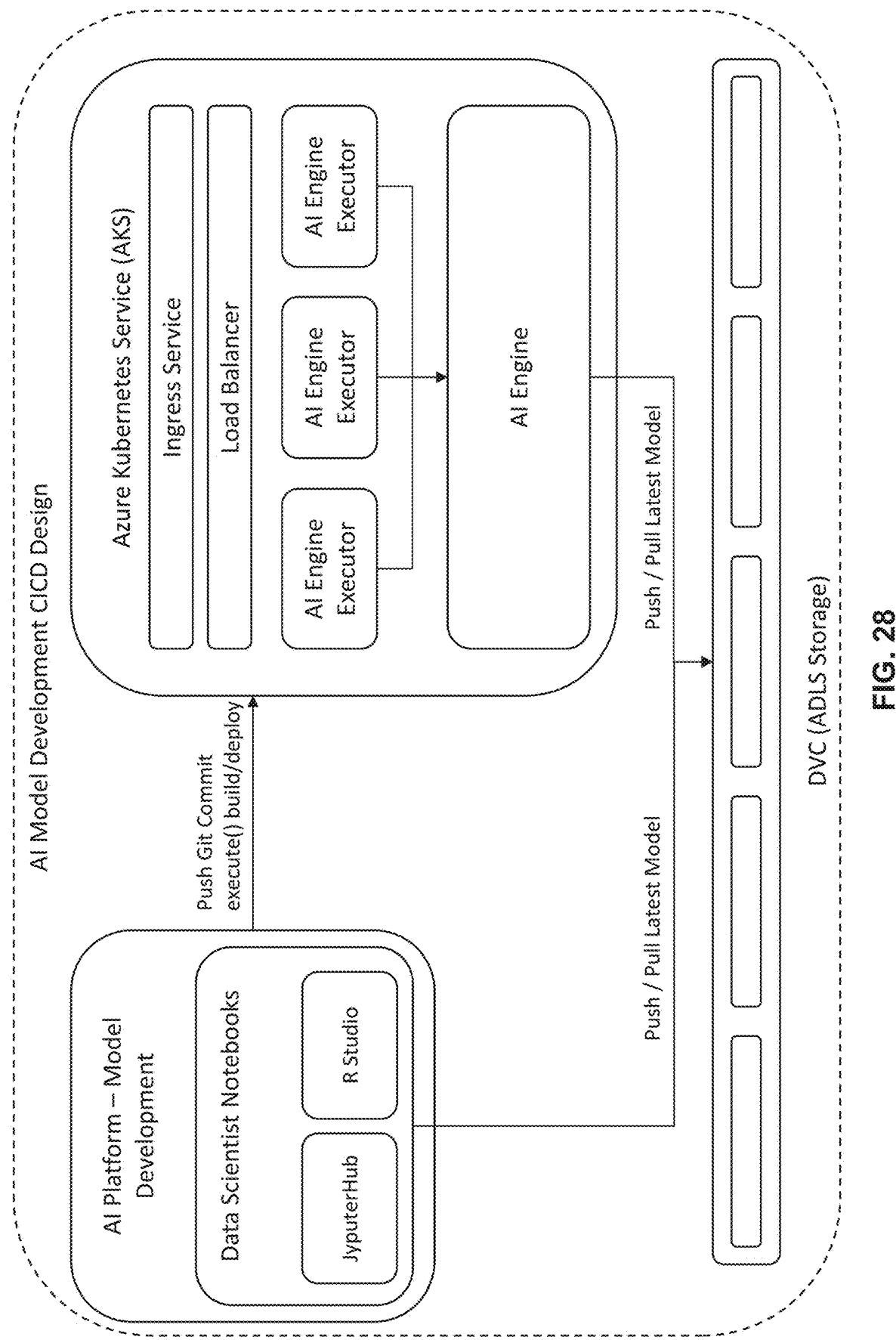
FIG. 28 provides a non-limiting schematic illustration of a continuous learning machine learning model development platform that provides continuous integration and continuous deployment (CICD).

FIG. 28 provides a non-limiting example of an AI-based continuous machine learning platform for data extraction model development that supports continuous integration and continuous deployment (CICD) capability. The AI platform-model development module, implemented as a series of microservices as described above using, e.g., JyputerHub notebooks or RStudio, communicates with the AI computing infrastructure, e.g., the Azure Kubernetes Service (AKS)—a Microsoft Azure-hosted Kubernetes service that simplifies deployment of a managed Kubernetes cluster (i.e., a set of nodes comprising a master node and agent nodes that run containerized applications) by handling critical tasks such as system health monitoring and maintenance. The Kubernetes cluster provides an open-source container-orchestration system for automating computer application deployment, scaling, and management. Since Kubernetes master nodes are managed by Azure, the client only manages and maintains the agent nodes. Computing platform functionality that is managed by AKS includes an ingress service (i.e., an object (or collection of rules) that allows access to the Kubernetes services from outside the Kubernetes cluster), a load balancer (that distributes network traffic among multiple back-end services efficiently), and a plurality of AI Engine Executors (i.e., Kubernetes executors which, in response to a Git Commit command, connect to the Kubernetes API in the cluster and create a Pod (or micro instance) for each submitted job; the Pod is made up of a build container, a helper container, and an additional container for each service defined in the Git Commit command and/or an associated configuration file) running on an AI Engine (e.g., the Kubernetes Engine—a managed, production-ready computing environment for running containerized applications). Both the AI platform-model development module and the AKS platform store and retrieve the latest versions of the document data extraction models from, e.g., ADLS storage, where they are stored under distributed version control (DVC).

Figure 29:
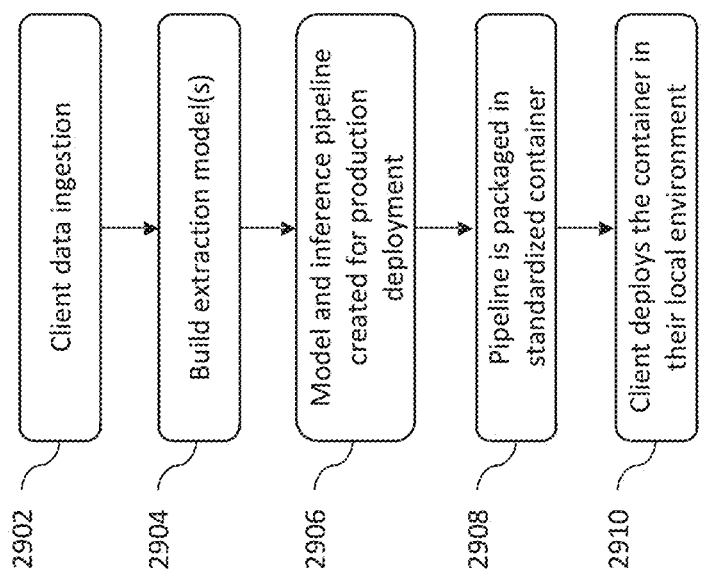
FIG. 29 provides a non-limiting example of a process flowchart for creating and deploying a document data extraction pipeline.

FIG. 29 provides a non-limiting example of a process flowchart for creating and deploying a document data extraction pipeline. Client data (e.g., electronic documents) is ingested at step 2902, following which one or more machine learning-based document data extraction models (term-based machine learning models) are developed at step 2904 according to any of the methods described herein. In combination with developing and training one or more document data extraction models which are specific for a particular user application, one or more pre-trained document data extraction models may be selected from a central repository (and optionally, re-trained or tuned) for use in creating a document data extraction pipeline at step 2906. The document data extraction pipeline is optionally packaged in a standardized container format at step 2908, for deployment in a client's local environment at step 2910.

Figure 30:
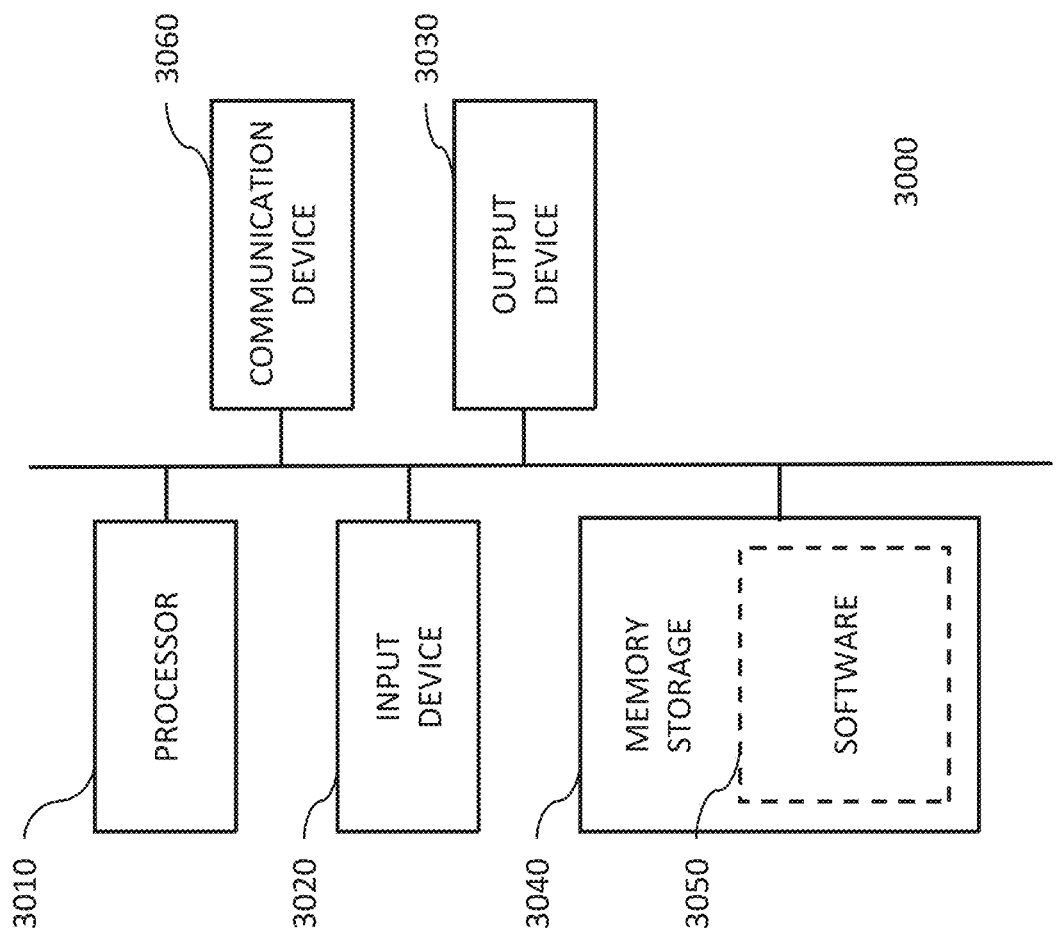
FIG. 30 provides a non-limiting schematic illustration of a computing system according to some examples described herein.

Processors and Computer Systems:

FIG. 30 illustrates an example of a computing device (e.g., a computer system) in accordance with one or more examples of the disclosure. Device 3000 can be a host computer connected to a network. Device 3000 can be a client computer or a server. As shown in FIG. 30, device 3000 can be any suitable type of microprocessor-based device, such as a personal computer, workstation, server, or handheld computing device (portable electronic device), such as a phone or tablet. The device can include, for example, one or more of processor 3010, input device 3020, output device 3030, storage 3040, and communication device 3060. Input device 3020 and output device 3030 can generally correspond to those described above, and they can either be connectable or integrated with the computer.

Input device 3020 can be any suitable device that provides input, such as a touch screen, keyboard or keypad, mouse, or voice-recognition device. Output device 3030 can be any suitable device that provides output, such as a touch screen, haptics device, or speaker.

Storage 3040 can be any suitable device that provides storage, such as an electrical, magnetic, or optical memory including a RAM, cache, hard drive, or removable storage disk. Communication device 3060 can include any suitable device capable of transmitting and receiving signals over a network, such as a network interface chip or device. The components of the computer can be connected in any suitable manner, such as via a physical bus or wirelessly.

Software 3050, which can be stored in memory/storage 3040 and executed by processor 3010, can include, for example, the programming that embodies the functionality of the present disclosure (e.g., as embodied in the devices described above).

Software 3050 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 3040, that can contain or store programming for use by or in connection with an instruction execution system, apparatus, or device.

Software 3050 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Device 3000 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 3000 can implement any operating system suitable for operating on the network. Software 3050 can be written in any suitable programming language, such as C, C++, Java, or Python. In various embodiments, application software embodying the functionality of the present disclosure can be deployed in different configurations, such as in a client/server arrangement or through a web browser as a web-based application or web service, for example.

EXAMPLES

Example 1—Continuous Machine Learning-Based Document Data Extraction Pipeline for Schedule K-1 Forms The methods and systems described herein may be used to develop term-based machine learning document data extraction models and deploy document data extraction pipelines for processing any of a variety of business documents, legal documents, etc. Examples of the types of documents that may be processed include, but are not limited to, contracts, invoices, licensing agreements, lease agreements, loan documents, tax forms, London Inter-bank Offered Rate (LIBOR) documents, etc. This example illustrates the training and use of machine learning document data extraction models for processing the Schedule K-1 (Form 1065) of the Internal Revenue Service.

Figure 31:
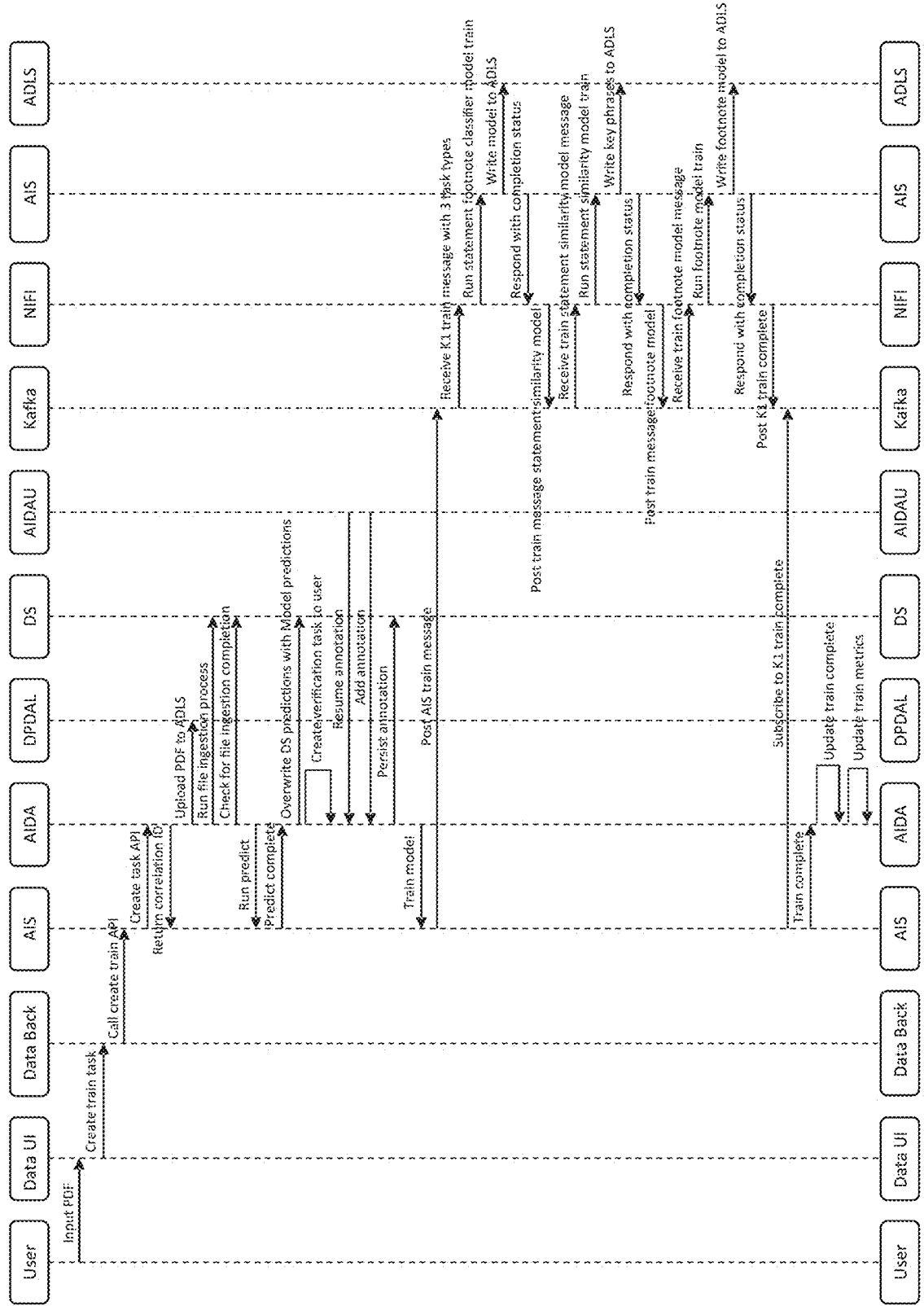
FIG. 31 provides a non-limiting example of a training sequence for training a plurality of machine-learning models to extract data from a Schedule K-1 (Form 1065) of the Internal Revenue Service.

FIG. 31 provides a non-limiting example of a training sequence for training a plurality of machine-learning models to extract data from a Schedule K-1 (Form 1065). The process begins in the upper left corner of the training sequence diagram in FIG. 31 with the user inputting documents (e.g., PDF documents) and project details (e.g., document types, labels for data to be extracted, etc.) via the upstream Tax application (Dataflow). The Dataflow application sends the documents to be trained to the Dataflow backend and creates a "training task", which is processed by Dataflow and issued as a "create train" API to the AI Services (AIS) platform. The AIS then issues a "create task" API to the AI-Driven Annotation (AIDA) tool, which returns a task identification number. The AIDA tool also uploads the input documents to storage (e.g., ADLS), runs the file ingestion process (for the AIDA system), and checks for completion of input file ingestion. A set of implicit annotation predictions based on one or more pre-trained models is executed upon task creation and completion of the file ingestion process, which the user then accepts or rejects. The user may correct predicted annotations or create new annotations and submit them for approval through a series of "overwrite", "add", "resume", "persist", and "user verification" tasks, following which AIDA sends the annotated documents, along with a "train model" instruction, to the AI Services (AI) platform for model training using the AI-based continuous learning engine described previously herein.

AIS posts the "train model" instruction to Apache Kafka (or "Kafka", an open-source distributed event streaming platform used for high-performance data pipelines, streaming analytics, and data integration), which in turn relays the "train K1 model" instruction via Apache NiFi (or "NiFi", an open source software for automating and managing the data flow between systems) to the AIS platform. The AIS platform trains a statement/footnote classifier to categorize and label statement text versus footnote text, and trains document data extraction models to extract data for their respective label categories (statement or footnote) from the annotated documents using category-level mapping, writes the trained K1 model(s) to ADLS, and returns a completion status message.

Upon completion of model training, a "training complete" message is relayed via NiFi and Kafka to AIS, and the model completion status and model performance metrics are updated in AIDA.

Figure 32:
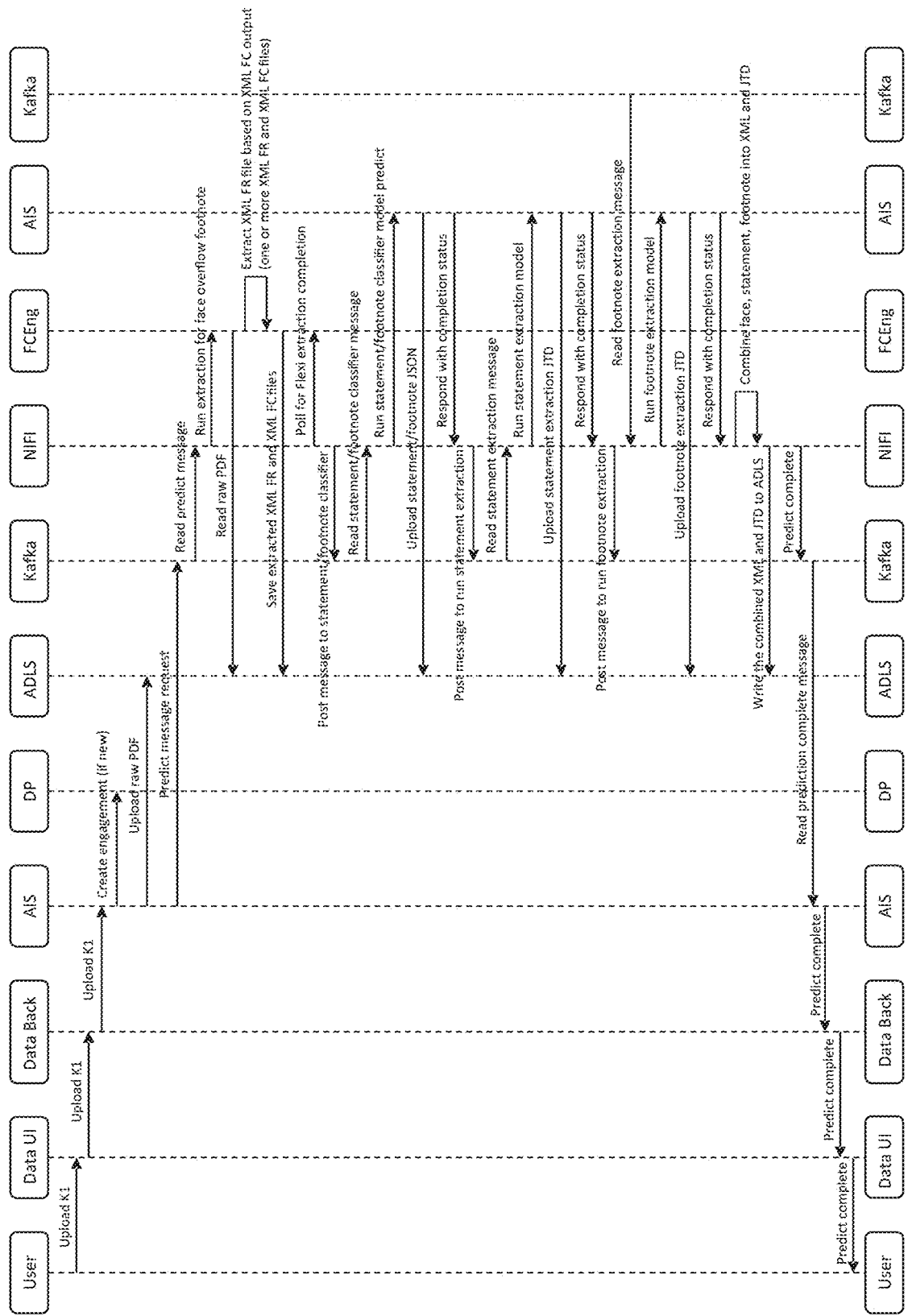
FIG. 32 provides a non-limiting example of a trained machine learning model prediction sequence for extracting data from a Schedule K-1 (Form 1065) of the Internal Revenue Service.

FIG. 32 a non-limiting example of a trained machine learning model prediction sequence for extracting data from a Schedule K-1 of the Internal Revenue Service. The data flow for document data extraction integrates with the AI-based machine learning engine through the AI Services (AIS) platform. The Schedule K-1 prediction process comprises four main steps: (i) the electronic Schedule K-1 documents are processed using the FlexiCapture Engine (FCEng), which combines ABBYY FlexiCapture, ABBYY FineReader, and ABBYY Optical Character Recognition (OCR) capabilities, to produce XML or JTD files; (ii) a trained Statement/Footnote Classifier model segments the text within the document into statement or footnote categories; (iii) a trained Statement Extractor model predicts which text corresponds to the statement labels, and a trained Footnote Extractor model predicts which text corresponds to the footnote labels. The combined output is sent back to the Dataflow application through the AI Services platform. The data extraction pipeline supports processing of multiple Schedule K-1 statements bundled in on PDF, and also supports processing of state and federal forms bundles in the same PDF.

The process begins in the upper left corner of the prediction sequence diagram in FIG. 32 with the user submitting a batch of Schedule K-1 forms via the Dataflow Interface, which are processed by the Dataflow backend and uploaded to the AI Services (AIS) platform. The AIS platform creates an engagement or job number (for new projects), uploads the raw PDF documents to ADLS, and sends a "prediction message request" to Kafka. Kafka relays the request to NiFi which sends instructions to the FlexiCapture Engine (FCEng) to run the extraction process for the face overflow footnote on the Schedule K-1 form. The FCEng performs OCR on the raw PDF file(s) and saves them to ADLS, and also extracts one or more XML FineReader file(s) based on the output from one or more XML FlexiCapture file(s). The extracted XML FineReader and XML FlexiCapture file(s) are also saved to ADLS. Upon confirmation that the extraction process has been completed, NiFi sends instructions to the AIS platform via Kafka to run the Statement/Footnote Classifier predictions, following which a statement/footnote JSON file is uploaded to ADLS. Upon confirmation that the statement/footnote classification process has been completed, NiFi sends instructions to the AIS platform to run the Statement Extractor model, following which a statement extraction JTD file is uploaded to ADLS. Upon confirmation that the statement extraction process has been completed, NiFi sends instructions to the AIS platform to run the Footnote Extractor model, following which a footnote extraction JTD file is uploaded to ADLS. Upon confirmation that the footnote extraction process has been completed, NiFi combines the face, statement, and footnote extractions into XML and JTD files and writes them to ADLS. A prediction complete message is then relayed via Kafka to AIS, Dataflow, and Dataflow Interface to the user.

Figure 33:
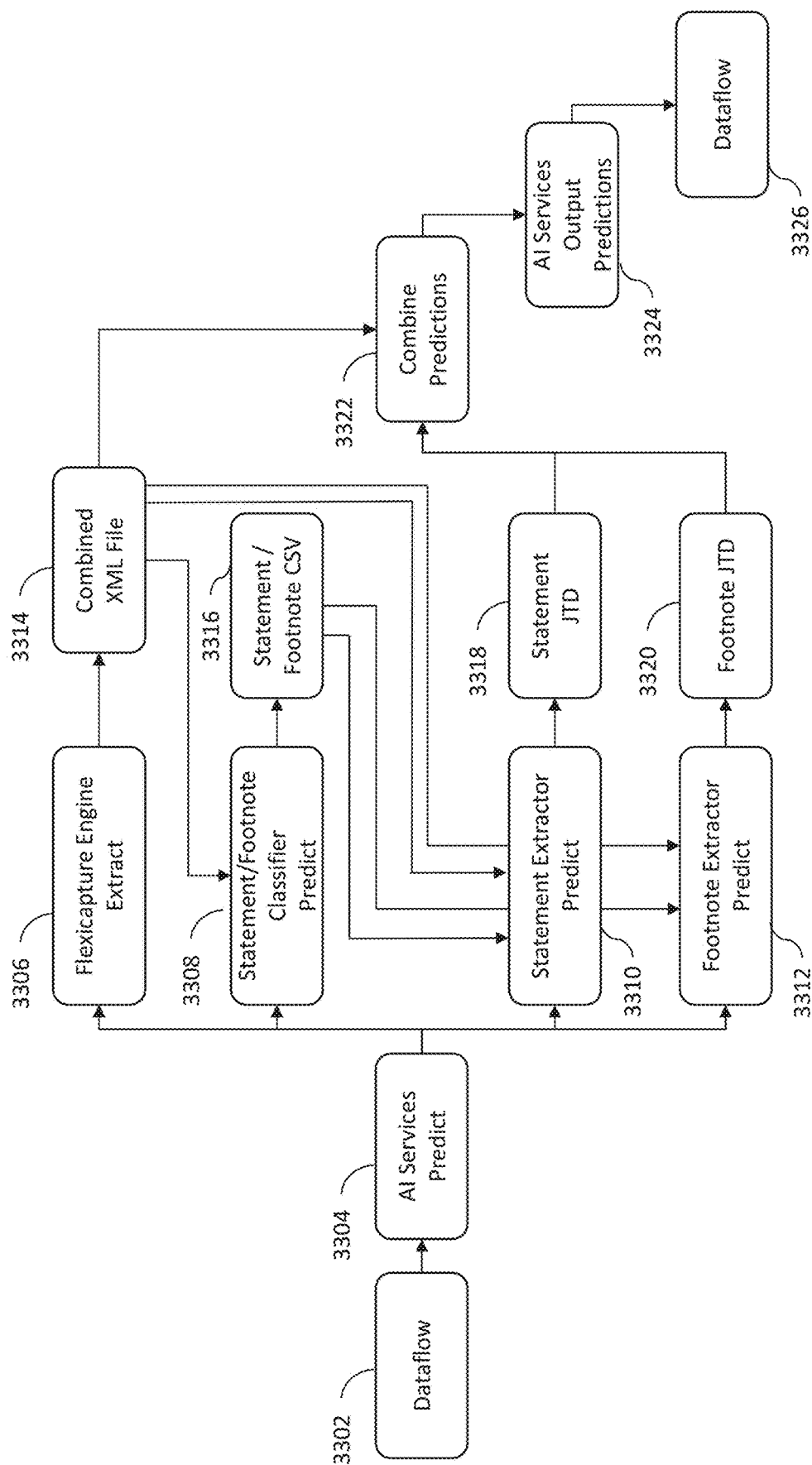
FIG. 33 provides a non-limiting example of a process flowchart for using a trained machine learning model pipeline for extracting data from a Schedule K-1 (Form 1065) of the Internal Revenue Service.

FIG. 33 provides a non-limiting example of a process flowchart for using a trained machine learning model pipeline (trained according to the training sequence illustrated in FIG. 31) to extract data from a Schedule K-1 of the Internal Revenue Service (according to the prediction sequence illustrated in FIG. 32). The user inputs Schedule K-1 forms (in PDF format) using the Dataflow user interface, at step 3302, to the AI Services prediction platform at step 3304. The AI Services prediction platform issues instructions to the FlexiCapture Engine to perform optical character recognition (OCR) and/or template-based extraction on the input documents at step 3306, which outputs the results to a combined XML file at step 3314. Once the combined XML file is available, the AI Services prediction platform issues instructions to the Statement/Footnote classifier to process the combined XML file at step 3308 and generate a Statement/Footnote CSV file comprising text category information at step 3316. Once the Statement/Footnote CSV file is available, the AI Services prediction platform issues instructions to the Statement Extractor Predict model to process the combined XML file and the Statement/Footnote CSV file at step 3310 to map text to category labels and extract document text corresponding to term labels (i.e., the tags used to annotate training documents and train the document data extraction model). The Statement Extractor Predict model outputs a Statement JTD file at step 3318 that contains the extracted text corresponding to the term labels (or tags) used to train the document data extraction model. The AI Services prediction platform also issues instructions to the Footnote Extractor Predict model to process the combined XML file and the Statement/Footnote CSV file at step 3312, which outputs a Footnote JTD file at step 3320. Once the Statement JTD file and Footnote JTD file are both available, the results are combined with the information in the combined XML file at step 3322, and uploaded to the AI Services output predictions platform at step 3324. The prediction results (extracted document data corresponding to the set of labels or tags used to train the document data extraction models) are made available to the user through the Dataflow user interface at step 3326.

Example 2—Continuous Machine Learning-Based Document Data Extraction Pipeline Applications The disclosed methods and systems may be applied to create automated document data extraction pipelines for process any of a variety of business, legal, government, tax, and technical documents. Several non-limiting examples of potential applications are listed in Table 1.

TABLE 1

Non-limiting examples of applications for continuous machine learning-based document data extraction.

| Document Type | Sub-Category | Notes |
|---|---|---|
| Business | General Contracts | Extract party names, dates, key terms, provisions, clauses, etc. |
| Business | Invoices | Extract customer names, dates, amounts, taxes, line item details, etc. |
| Business | Lease agreements | Extract party names, dates, key terms, provisions, clauses, schedules, etc. |
| London Interbank Offered Rate (LIBOR) | Loan Origination System (LOS) | Currently the world's most widely used benchmark for short-term rates. Extract party names, dates, rates, provisions, terms, clauses, etc. |
| PFIC | Tax | Extract footnotes related to Passive Foreign Investment Footnotes from tax documents and complete Schedule K-1's that are sent to investors |
| Schedule K-1 forms | Tax | Leverage NLP to extract data from Schedule K-1 statements, footnotes, & overflow statements |

It should be understood from the foregoing that, while particular implementations of the disclosed methods and systems have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A computer-implemented method for annotating an electronic document comprising:
    displaying an electronic document, or a page therefrom, on an electronic display device;
    displaying a suggestion of labels that may be applicable to categories of text within the electronic document;
    receiving a first input from a user indicating a first selection of text in the electronic document;
    receiving a second input from the user to assign a first label from the suggested labels to the selected text;

storing the assigned first label, the first selection of text, and the location of the first selection of text for one or more instances of the first selection of text within the electronic document as an annotated electronic document;

receiving a third input from the user indicating a second selection of text in the electronic document;

receiving a fourth input from the user to assign a second label from the suggested labels to the second selection of text;

storing the assigned second label, the second selection of text, and the location of the second selection of text for one or more instances of the second selection of text within the annotated electronic document; and using the annotated electronic document to train or retrain a first machine learning model to extract text corresponding to the first label and to train or retrain a second machine learning model to extract text corresponding to the second label, wherein the first and second machine learning models are deployed in a continuous learning-based document data extraction pipeline.

2. The computer-implemented method of claim 1, wherein the suggestion of labels is based on an artificial intelligence-based prediction.

3. The computer-implemented method of claim 1, wherein the first and second machine learning models are stored in a repository of user-selectable machine learning models for performing data extraction from electronic documents.

4. The computer-implemented method of claim 1, further comprising receiving a fifth input from the user to assign a custom label to a selection of text.

5. The computer-implemented method of claim 1, wherein the selection of text comprises a word, a phrase, a sentence, a paragraph, a section, or a table.

6. The computer-implemented method of claim 1, wherein the list of labels comprises a list of text categories that includes name, date, execution date, effective date, expiration date, delivery date, due date, date of sale, order date, invoice date, issuance data, address, address line 1, street address, quantity, amount, cost, cost of goods sold, signature, or any combination thereof.

7. The computer-implemented method of claim 1, further comprising repeating the method for one or more additional electronic documents and storing the one or more additional annotated electronic documents.

8. The computer-implemented method of claim 7, further comprising using the stored one or more additional annotated electronic documents as training data to train or retrain a machine learning model to automatically predict and extract selections of text corresponding to a label from non-annotated electronic documents.

9. The computer-implemented method of claim 8, further comprising:

using the trained machine learning model to predict selections of text corresponding to the label from one or more non-annotated validation electronic documents;

sequentially displaying each of the one or more validation electronic documents, or pages therefrom, on an electronic display device, wherein the predictions of text corresponding to the label are graphically highlighted;

sequentially receiving feedback from the user on accuracy of the predicted selections of text corresponding to the label in each of the one or more validation electronic documents; and approving or correcting each of the one or more validation electronic documents according to the feedback from the user.

10. The computer-implemented method of claim 9, further comprising retraining the machine learning model using the one or more approved or corrected validation electronic documents.

11. The computer-implemented method of claim 1, wherein the electronic document, or the page therefrom, is displayed within a first region of a graphical user interface on the electronic display device.

12. The computer-implemented method of claim 11, wherein the suggestion of labels is displayed within a second region of the graphical user interface.

13. The computer-implemented method of claim 11, further comprising displaying, within the first region of the graphical user interface, a first graphic element comprising the assigned first label and the first selection of text, wherein the first graphic element is adjacent to, or overlaid on, a location of the first selection of text.

14. The computer-implemented method of claim 11, further comprising displaying, within the first region of the graphical user interface, a second graphic element comprising the assigned second label and the second selection of text, wherein the second graphic element is adjacent to, or overlaid on, a location of the first selection of text.

15. A computer-implemented method for electronic document annotation comprising:

displaying an electronic document, or a page therefrom, on an electronic display device;

receiving a first input from a user indicating a selection of a label that may be applicable to categories of text within the electronic document;

displaying a selection of text in the electronic document that may match a category of text corresponding to the user-selected label;

receiving a second input from the user to confirm a match between the selection of text and the category of text corresponding to the user-selected label, thereby assigning the label to the selection of text; and storing the assigned label, the selection of text, and a location of the selected text for one or more instances of selected text within the electronic document as an annotated electronic document;

wherein the annotated electronic document is used to train or retrain one or more term-based machine learning models, and wherein the one or more term-based models are used for document data extraction in a continuous learning-based document data extraction pipeline.

16. The computer-implemented method of claim 15, wherein the selection of text is based on an artificial intelligence-based prediction.

17. The computer-implemented method of claim 15, further comprising repeating the steps of receiving a first input from the user indicating a selection of a label, displaying a selection of text that may match a category of text corresponding to the user-selected label, and receiving a second input from the user to confirm a match and assign the label to the selection of text for one or more additional labels.

18. A system comprising:

one or more processors;

a memory;

an electronic display device; and one or more programs, wherein the one or more programs are stored in the memory and configured to be executed by the one or more processors, the one or more programs including instructions for:

displaying an electronic document, or a page therefrom, on the electronic display device;

receiving a first input from a user indicating a selection of a label that may be applicable to categories of text within the electronic document;

displaying a selection of text that may match a category of text corresponding to the user-selected label, wherein the selection of text is based on an artificial intelligence-based prediction by the system;

receiving a second input from the user to confirm a match between the selection of text and the category of text corresponding to the user-selected label, thereby assigning the label to the selection of text; and storing the assigned label, the selection of text, and a location of the selected text for one or more instances of selected text within the electronic document as an annotated electronic document;

wherein the annotated electronic document is used to train or retrain one or more term-based machine learning models, and wherein the one or more term-based models are used for document data extraction in a continuous learning-based document data extraction pipeline.

19. The system of claim 18, further comprising instructions for repeating the steps of receiving a first input from the user indicating a selection of a label, displaying a selection of text that may match a category of text corresponding to the user-selected label, and receiving a second input from the user to confirm a match and assign the label to the selection of text for one or more additional labels.

20. A non-transitory computer-readable storage medium storing one or more programs, the one or more programs comprising instructions, the instructions when executed by one or more processors of a computing platform, cause the computing platform to:

display an electronic document, or a page therefrom, on an electronic display device;

receive a first input from a user indicating a selection of a label that may be applicable to categories of text within the electronic document;

display a selection of text that may match a category of text corresponding to the user-selected label, wherein the selection of text is based on an artificial intelligence-based prediction;

receive a second input from the user to confirm a match between the selection of text and the category of text corresponding to the user-selected label, thereby assigning the label to the selection of text; and store the assigned label, the selection of text, and a location of the selected text for one or more instances of selected text within the electronic document as an annotated electronic document;

wherein the annotated electronic document is used to train or retrain one or more term-based machine learning models, and wherein the one or more term-based models are used for document data extraction in a continuous learning-based document data extraction pipeline.

* * * * *